United States Patent
Miyazaki et al.

(10) Patent No.: US 6,445,437 B1
(45) Date of Patent: Sep. 3, 2002

(54) LIQUID CRYSTAL DISPLAY DEVICE

(75) Inventors: Daisuke Miyazaki, Kamakura; Shoichi Kurauchi, Yokohama; Hitoshi Hatoh, Yokohama; Akiko Ueno, Yokohama; Teruyuki Midorikawa, Yokohama; Makoto Hasegawa, Kamakura, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/388,945

(22) Filed: Sep. 2, 1999

Related U.S. Application Data

(62) Division of application No. 08/708,485, filed on Sep. 5, 1996, now Pat. No. 5,978,061.

(30) Foreign Application Priority Data

Sep. 6, 1995 (JP) .............................. 7-228968
Sep. 6, 1995 (JP) .............................. 7-228969
Sep. 6, 1995 (JP) .............................. 7-229526

(51) Int. Cl.[7] ............. G02F 1/1335; G02F 1/1339; G02F 1/1337
(52) U.S. Cl. ............. 349/156; 349/106; 349/126
(58) Field of Search ............. 349/106, 155, 349/156, 123, 151, 126; 399/100, 155, 123, 156

(56) References Cited

U.S. PATENT DOCUMENTS

| | | | |
|---|---|---|---|
| 4,422,731 A | 12/1983 | Droguet et al. | 349/155 |
| 5,177,627 A | 1/1993 | Ishiwata et al. | 349/110 |
| 5,499,128 A | 3/1996 | Hasegawa et al. | 349/155 |
| 5,504,601 A | 4/1996 | Watanabe et al. | 349/42 |
| 5,517,343 A | 5/1996 | Yamahara et al. | 349/139 |
| 5,593,802 A | 1/1997 | Sato et al. | 430/20 |
| 5,680,187 A | * 10/1997 | Nagayama et al. | 349/156 |
| 5,748,266 A | * 5/1998 | Kodate | 349/106 |
| 5,777,713 A | 7/1998 | Kimura | 349/156 |
| 5,812,232 A | 9/1998 | Shiroto et al. | 349/157 |
| 5,917,572 A | * 6/1999 | Kurauchi et al. | 349/156 |
| 5,969,784 A | * 10/1999 | Miyazaki et al. | 349/155 |

FOREIGN PATENT DOCUMENTS

| | | |
|---|---|---|
| JP | 56-380085 | 4/1981 |
| JP | 59-139018 | 8/1984 |
| JP | 59-191014 | 10/1984 |
| JP | 61-2130 | 1/1986 |
| JP | 61-7823 | 1/1986 |
| JP | 61-183625 | 8/1986 |
| JP | 62-90622 | 4/1987 |
| JP | 64-930 | 1/1989 |
| JP | 2-298916 | 12/1990 |
| JP | 4-240622 | 8/1992 |
| JP | 05-088187 | 4/1993 |
| JP | 5-196946 | 8/1993 |
| JP | 7-212192 | 8/1995 |

* cited by examiner

Primary Examiner—Toan Ton
(74) Attorney, Agent, or Firm—Finnegan, Henderson, Farabow, Garrett & Dunner, L.L.P.

(57) ABSTRACT

A improved liquid crystal display device including two substrates each having transparent electrode thereon disposed in parallel while keeping a predetermined gap by means of pillar-shaped spacers and a liquid crystal held between said first and second substrates is proposed. In the liquid crystal display device, density or volume of the number of the pillar-shaped spacers provided in the off-display area is higher than those of a density of the number of said pillar-shaped spacers provided in the display area. This change is made continuously or stepwise along areas. The spacers are preferably disposed so that a contact area between the spacer and a rubbing cloth during the rubbing process is minimized, or so that an orientation defective area caused starting from the spacer does not extend into the pixel area, or so that a plurality of spacers are disposed along a flow of liquid crystal from filling port into the gap between the first and second substrate.

3 Claims, 18 Drawing Sheets

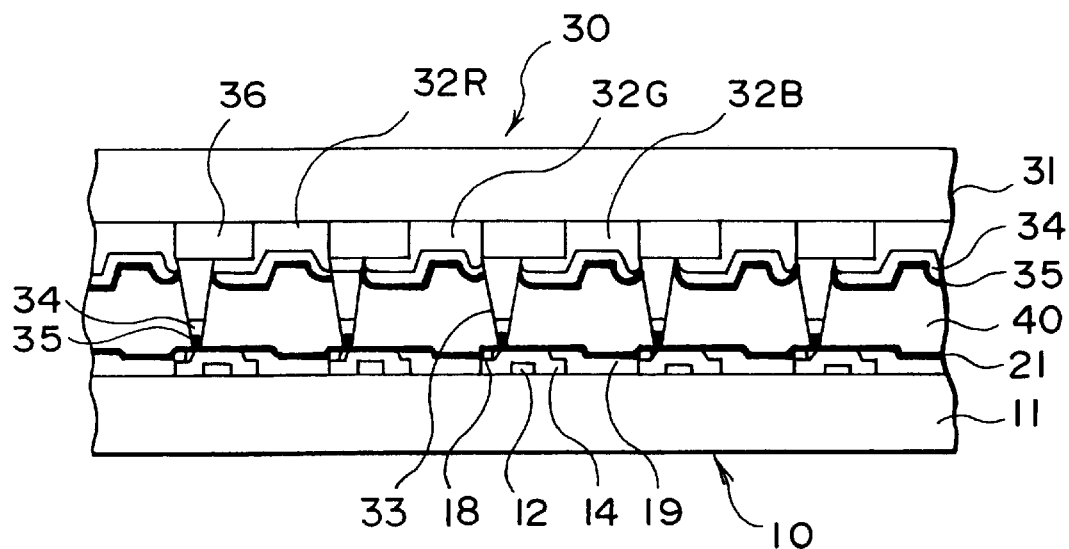
FIG. 12
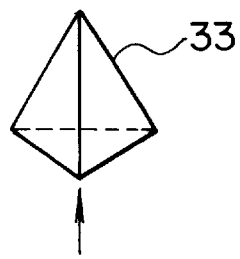
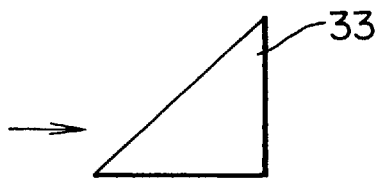
FIG. 13A        FIG. 13B

RESULT OF OBSERVATION OF ELLIPTICAL SPACER AFTER RUBBING

| a (MAJOR DIA.) ($\mu m$) | b(MINOR DIA.) ($\mu m$) | | | | |
|---|---|---|---|---|---|
| | 6 | 8 | 10 | 12 | 14 |
| 6 | × | × | × | × | △ |
| 11 | × | × | ○ | ○ | ○ |
| 16 | × | △ | ○ | ○ | ○ |
| 21 | × | △ | ○ | ○ | ○ |

FIG. 27

RESULT OF OBSERVATION OF SPACER AFTER RUBBING

| a (LENGTH) ($\mu m$) | b (WIDTH) ($\mu m$) | | | | | |
|---|---|---|---|---|---|---|
| | 3 | 4 | 5 | 6 | 7 | 8 |
| 20 | × | × | × | × | × | × |
| 25 | × | × | × | × | × | × |
| 30 | × | × | × | × | △ | △ |
| 35 | × | × | ○ | ○ | ○ | ○ |
| 40 | × | △ | ○ | ○ | ○ | ○ |

FIG. 33

ORIENTATION DIRECTION

VERTICAL DIRECTION

HORIZONTAL DIRECTION

LIQUID CRYSTAL DISPLAY DEVICE

This is a division of application Ser. No. 08/708,485, filed Sep. 5, 1996, U.S. Pat. No. 5,978,061.

BACKGROUND OF THE INVENTION

1. Field of the Invention

The present invention relates generally to a liquid crystal display device and, more particularly, to an improvement pertaining to a pillar-shaped spacer for keeping constant a distance between two substrates for sealing a liquid crystal in the liquid crystal display device.

2. Description of the Background Art

A liquid crystal display device generally employed nowadays is constructed such that two glass substrates having electrodes are set in a face-to-face relationship, peripheries of these two substrates exclusive of a liquid filling port are fixed by a bonding agent, a liquid crystal is interposed between the two substrates, and the liquid crystal filling port is sealed by a sealing agent. Plastic beads or the like having a uniform particle diameter are dispersed between the substrates by way of a spacer for keeping a fixed distance between these two substrates.

A liquid crystal display device for color display includes color filters R, G and B of color layers that are disposed on one of the two glass substrates. For instance, a color dot matrix liquid crystal display device based on a simple matrix drive includes a Y-substrate having a Y-electrode subjected to band-like patterning in a lateral (Y) direction and an X-substrate having color layered under the X-electrode subjected to the band-like patterning in a vertical (X) direction, wherein the X- and Y-substrates are provided in a face-to-face relationship so that the X- and Y-electrodes are substantially orthogonal to each other, and a liquid crystal material is sealed in therebetween. The liquid crystal display device may involve the use of display systems such as, e.g., TN (Twisted Nematic) type, STN (Super Twisted Nematic) type, GH (Guest Host) type, or ECB (Electrically Controlled Birefringence) type and a dielectric liquid crystal. The sealing agent involves the use of, e.g., a bonding agent of a heat hardening type or an ultraviolet ray hardening acrylic or epoxy group. Further, the color active matrix drive liquid crystal display device is constructed of a TFT active matrix substrate, i.e., an active matrix substrate formed with a switching element, e.g.; a thin-film transistor (TFT) with a semiconductor layer composed of amorphous silicon (a-Si), and a pixel electrode, a signal electrode and a gate electrode that are connected thereto, and also an opposite substrate disposed in the face-to-face relationship with the TFT active matrix substrate. The color filters R, G and B are provided on the opposite substrate. Disposed on a screen peripheral portion is a silver paste serving as an electrode transfer member (transfer) for applying a voltage to the opposite substrate from above the active matrix substrate. The two substrates are electrically connected by this electrode transfer member, and the liquid crystal material is sealed in between those two substrates. Furthermore, polarizing plates are secured on both side of those two substrates.

In the liquid crystal display device using the plastic beads as a spacer, however, orientations of the liquid crystal peripheral to the spacer, which liquid crystal is scattered between the two substrates, are disordered, resulting in such a tendency that the contrast declines due to a leakage of light beams from the spacer peripheral portion. Moreover, the spacers are hard to disperse uniformly and are arranged with ununiformity during a step of dispersing the spacers on the substrate. This results in a display defect, which in turn brings about a decreases in yield of the product.

Moreover, in the liquid crystal display device of nowadays, when the two substrates are bonded in the forming step, there is taken a method of coating a sealing material over the one-side substrate of the two substrate, superposing this substrate on the other substrate, and hardening the sealing material while applying a pressure by a pressing device. On this occasion, a strong pressure tends to be applied upon an outer peripheral portion of the substrate, and therefore a substrate-to-substrate gap of the outer peripheral portion is easy to reduce. This might cause a display defect attributed to a deterioration in terms of cell gap.

On the other hand, if a spacer density on the entire surface of the substrate is increased as a countermeasure against the deterioration of the cell gap, there arises a problem in which vacuum bubbles are easy to produce in a liquid crystal layer.

Proposed in, e.g., Japanese Patent Application No. 7-212192 by way of a countermeasure against the abovementioned are a method of forming the spacers in positions exclusive of a display area while superposing color layers of a color filter, and a method of forming pillar-shaped spacers by use of photo resists.

There were, however, found two points in the pillar-shaped spacer, which should be improved.

A first point is concerned with a rubbing process. In the case of depositing an orientation film after forming the pillar-shaped spacer and forming a multiplicity of hyperfine grooves in the whole orientation film in one direction by use of a rubbing cloth, the rubbing cloth contacts the pillar-shaped spacer. On this occasion, a comparatively large stress (frictional resistance) is applied upon the rubbing cloth because of the pillar-shaped spacer taking a square or round shape, with the result that staples of the rubbing cloth are bent or damaged. If the rubbing cloth containing defective staples is continuously used, this leads to an execution of an ununiform rubbing process, which in turn might cause a display defect.

Further, the staples of the rubbing cloth are temporarily bent by the pillar-shaped spacer, and consequently the ununiform hyperfine grooves are partially formed till the bent staples of the rubbing cloth revert to the previous state. This conduces to a partial rubbing deterioration in the vicinity of the pillar-shaped spacer, which might further cause the display defect.

A second point is concerned with a mechanical strength of the pillar-shaped spacer. The pillar-shaped spacer is formed directly on the substrate by using a resin or a photosensitive resin. The resin and the photosensitive resin are high polymer materials and therefore insufficient in terms of the mechanical strength such as a rigidity and an adhesion. The spacer is easy to exfoliate ad deform. consequently, there are produced such an inconvenience that a reliability on the liquid crystal display device decreases.

Further, an inter substrate distance is as narrow as 2 μm, and the pillar-shaped spacer might become an obstacle against an inflow of the liquid crystal when the liquid crystal permeates. Especially a ferroelectric liquid crystal is hard to permeate.

Moreover, as explained above, in the liquid crystal display device, the liquid crystal is sealed in between two pieces of upper and lower substrates, and the display is performed by applying the voltage across the electrodes of the upper and lower substrates and controlling motions of liquid crystal molecules. However, the voltage is applied across the electrodes of the upper and lower substrates, and hence a power supply is hitherto connected to only one substrate. Then, silver paste as a transfer is disposed at a screen peripheral portion by a dispenser or the like, and the two substrates are electrically connected by this transfer.

In the above-mentioned transfer forming step, however, large costs for equipments and expenditures for labors are needed. Further, it is required that a portion for disposing the transfer in the screen peripheral portion be provided to have a considerable areal size (over approximately 1–2 mm) in a non-display area peripheral to the liquid crystal cell, including a margin for the transfer forming step. Therefore, the non-display area peripheral to the liquid crystal cell can not b e reduced. Moreover, the liquid crystal material and the orientation film are contaminated with impurities mixed when filling the dispense r with the transfer material, resulting in the display defect and a drop in terms of the yield.

SUMMARY OF THE INVENTION

It is a primary object of the present invention to provide a liquid crystal display device capable of reducing a display defect attributed to a deterioration in cell gap, increasing a yield, requiring a small amount of costs and exhibiting a high display performance.

It is another object of the present invention to provide a liquid crystal display device capable of preventing a disorder in orientation that is caused in a rubbing process upon an introduction of a pillar-shaped spacer, and thereby preventing the display performance from be decreased.

It is still another object of the present invention to provide a liquid crystal display device capable of facilitating permeation of a liquid crystal.

According to the present invention, a density or volume os the spacers is set higher in an off-display area than in a display area.

Further, according to the present invention, the number of steps can be decreased by using the spacer itself as a transfer.

Moreover, according to the present invention, the contact with the rubbing cloth when rubbed is reduced, and hence the spacer assumes a configuration with a small width. With this configuration, the mechanical strength of the spacer can be increased, and both the deterioration of the rubbing cloth and the defect in the orientation can be reduced.

Further, the contrivance is given in terms of the spacer position so as not to exert an influence of the orientation defect caused by the rubbing upon the pixel or so as not to make the influence occur conspicuously. It is therefore possible to prevent a deterioration in display quality.

The spacers may be disposed along a permeation flow of the liquid crystal. With this arrangement, the resistance is reduced, thereby making it possible to facilitating the permeation of the liquid crystal while keeping the mechanical strength of the spacers.

Additionally, a distribution of the spacers has an optimal value, and the distance between the two substrates can be uniformly precisely controlled within the screen by prescribing the optimal value.

BRIEF DESCRIPTION OF THE DRAWINGS

Other objects and advantages of the present invention will become apparent during the following discussion in conjunction with the accompanying drawings, in which:

FIG. 12 is a sectional view schematically showing the liquid crystal display device in a seventh embodiment of the present invention;

FIGS. 13A and 13B are explanatory views each schematically showing a configuration of the spacer used in the embodiment of FIG. 12;

FIG. 27 is a table showing a relationship between major and minor diameters of an elliptical spacer and a defect after rubbing;

FIG. 33 is a table showing a relationship between a length, a width and a strength of the rectangular spacer;

DESCRIPTION OF THE PREFERRED EMBODIMENTS

Some of embodiments of the present invention will hereinafter be described.

Figure 1:
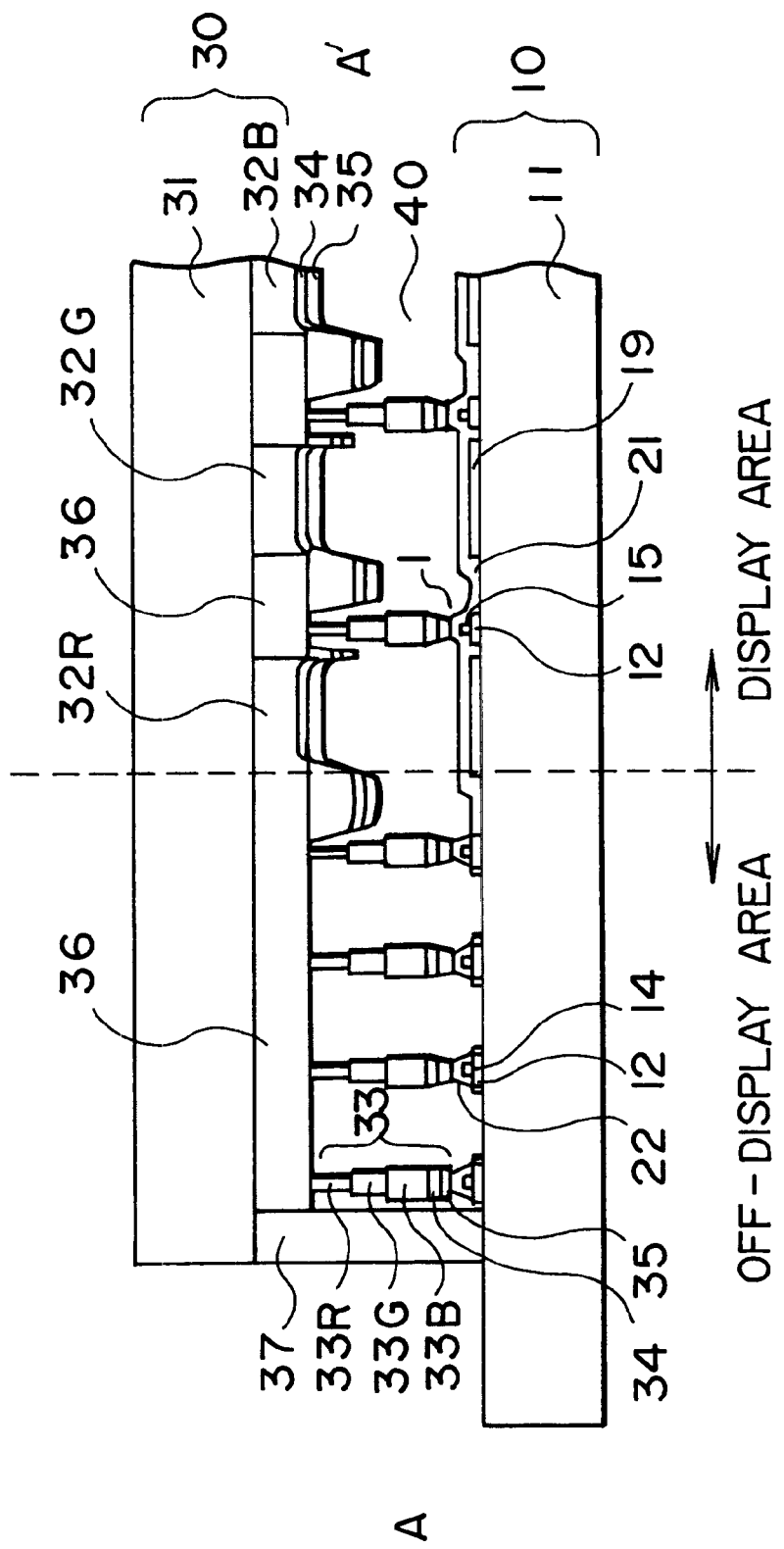
FIG. 1 is a sectional view illustrating a liquid crystal display device in a first embodiment of the present invention.
Figure 2:
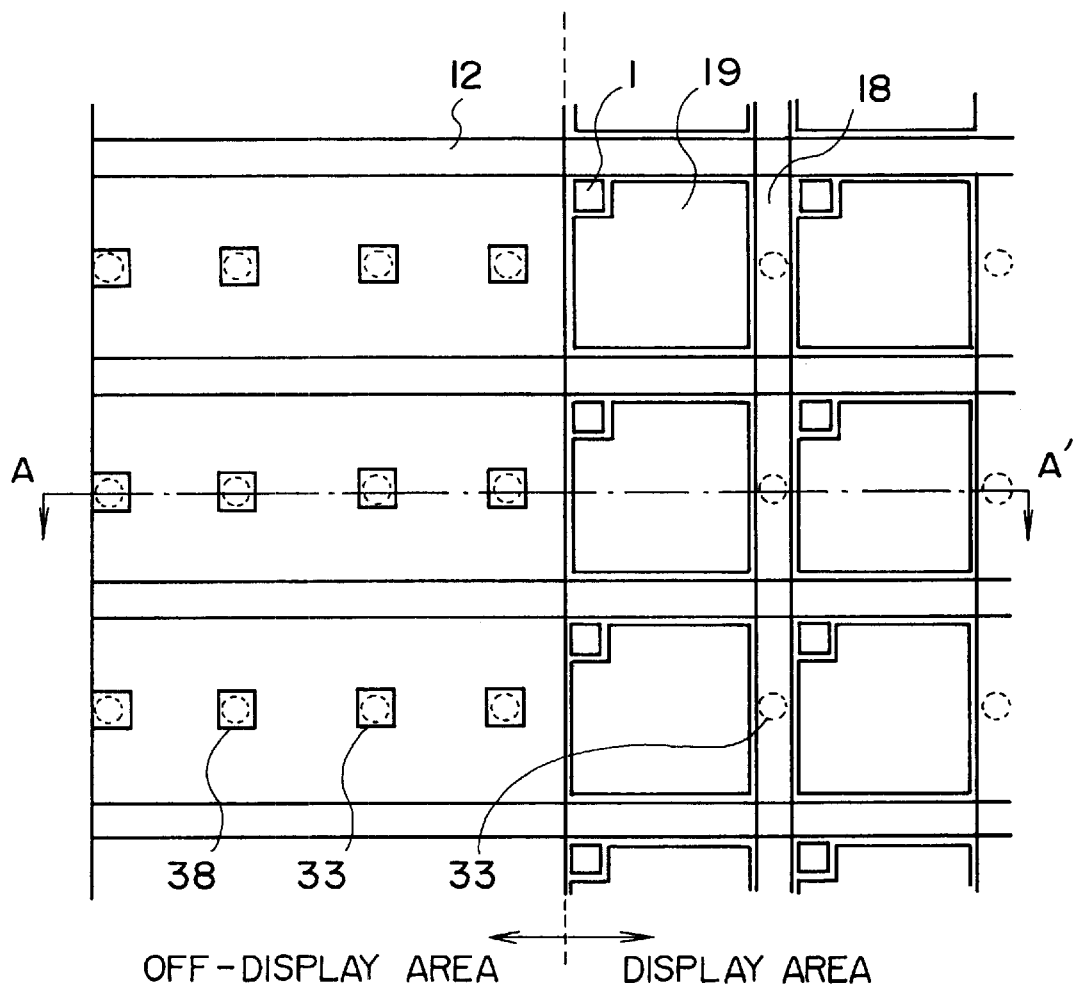
FIG. 2 is a plan view showing an array pattern of the liquid crystal device in the first embodiment of the present invention.

FIG. 1 is a sectional view illustrating a liquid crystal display device in accordance with a first embodiment of the present invention. This sectional view shows a section cut substantially along the line A–A' in a plan view illustrating an array pattern of FIG. 2. Pixel electrodes 19 corresponding to pixels are arrayed in matrix on a display area. Further, a thin-film transistor (TFT: Thin Film Transistor) 1 serving as a switching element is provided per pixel.

This liquid display device is structured such that an active matrix substrate 10 defined as a lower substrate and an opposite substrate 30 defined as an upper substrate are disposed in parallel with a liquid crystal 40 interposed therebetween, and the liquid crystal 40 is sealed by a sealing material 37.

At first, the active matrix substrate 10 is constructed such that a TFT 1 is provided on a glass substrate 11, and the pixel electrode 19 is connected to the TFT 1.

Figure 3:
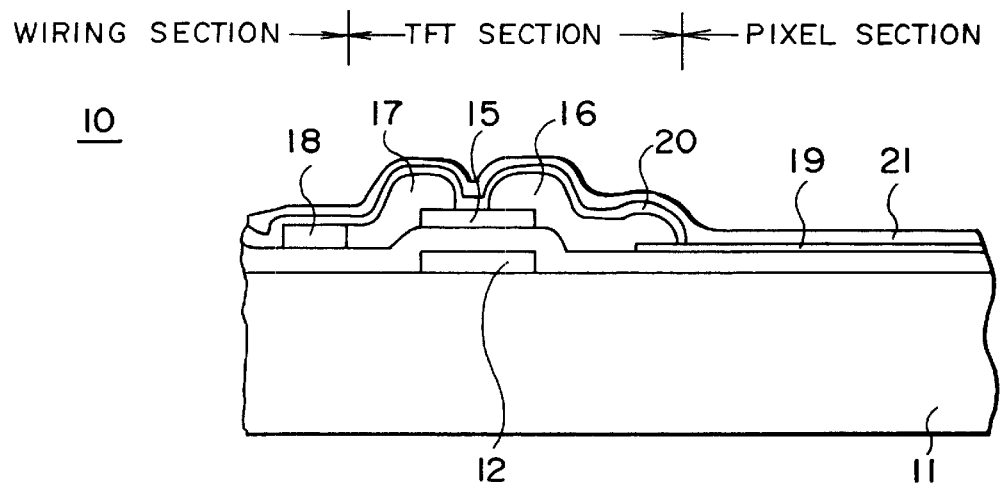
FIG. 3 is an enlarged sectional view illustrating a structure of a thin-film transistor of the liquid crystal display device in the first embodiment of the present invention.

FIG. 3 is a sectional view of the active matrix substrate. An insulating film 14 covers a gate electrode 12 composed of MoW (Molybdenum Tungsten) or MoTa (Molybdenum Tantalum) at a TFT portion on the side of a main surface of the glass substrate 11. A semiconductor layer 15 composed of an amorphous silicon is provided corresponding to the gate electrode 12 thereon, and a source electrode 16 and a drain electrode 17 are disposed right and left. The pixel electrode 19 is connected to the source electrode 16 which is covered with an insulating film 20. Further, a gate line 13 coupled to the gate electrode is disposed on a wiring portion. A signal line 18 coupled to the drain electrode is disposed above the gate line 13 with the insulating filllm interposed therebetween so that the signal line crosses the gate line. An orientation film 21 is provided on a layer disposed farthest from the substrate.

Referring back to FIGS. 1 and 2, a dummy pattern 22 is disposed in an off-display area on. the active matrix substrate 10, the dummy pattern 22 serving to adjust a is height to a portion of the pillar-shaped spacer 33 formed on the opposite substrate 30 when bonded afterward to the opposite substrate 30.

Next, the opposite substrate 30 is constructed such that black light shielding layers 36 are provided in areas exclusive of the pixel portions on the glass substrate 31, and three color layers 32R, 32G, 32B of R, G and B are provided in gaps between the light shielding layers 36. The light shielding layer 36 has a narrow band-like portion between the pixels and a wide band-like portion along an outermost periphery. Then, a display area is provided inwardly of the light shielding layer disposed on the outer peripheral portion, and an off-display area is provided including the light shielding layer 36 disposed on the outer peripheral portion but is provided outwardly of the light shielding layer 36. It is assumed that the off-display area includes an outer side of the sealing material 37.

Further, on the opposite substrate 30, the pillar-shaped spacer 33 is disposed, astride of the display area and the off-display area, on the light shielding layer 36. Then, a density of the number of pillar-shaped spacers 33 disposed in the off-display area is higher than a density of the number of pillar-shaped spacers 33 disposed in the display area. Moreover, a common electrode 34 is provided on an entire surface, and an orientation film 35 is disposed on an uppermost layer.

Next, a process of manufacturing the liquid crystal display device in this embodiment will be described. To start with, the active matrix substrate will be explained.

A film formation and patterning are repeated on a #7059™ glass substrate 11 having a thickness of 1.1 mm and made by Corning Corp., thus forming a TFT 1. Disposed on this occasion are a gate line 12, an unillustrated storage capacitance line and a leading electrode for transfer, which is integral with the storage capacitance line. Deposited thereon by the plasma CVD method is SiOx to have a thickness on the order of 4000 Å, and the patterning is executed, thereby forming a gate insulating film 14. Herein, a dummy pattern 22 is formed of the gate line 12 and the gate insulating film 14 o adjust a height in a position of an impingement of the pillar-shaped spacer 33 disposed on the opposite substrate 30 When afterward bonded to the opposite substrate 30. This dummy pattern 22 may be also formed of the gate insulating film 14 and a signal line 18.

Deposited thereon is a semiconductor layer 15 composed of a-Si (amorphous silicon) by the plasma CVD method, and the patterning is effected in a predetermined configuration.

Furthermore, there is formed an electrode composed of Mo/Al/Mo through an unillustrated n⁺a-Si ohmic contact layer as the case may be, and then the patterning is executed in desired configurations, thereby forming the source electrode 16 and the drain electrode 17.

Next, ITO defined as a transparent electrode is subjected to the patterning so as to contact the source electrode 16, thus forming a pixel electrode 19. Finally, AL-1051™ (made by Japan Synthetic Rubber Co., Ltd.) serving as an orientation film material belonging to a polyimide group is coated to have a thickness on the order of 500 Å over the whole surface, and a rubbing process is executed, thereby forming an orientation film 21.

Next, the opposite substrate 30 is formed in the following manner. Photosensitive black resin CK-2000™ (made by Fuji Hunt Electronics Technology Co., Ltd.) is coated by use of a spinner over the #7059 substrate 31 having a thickness of 1.1 mm and made by Corning Corp., and, after being dried a 90° for 10 minutes, this is exposed with an exposure quantity of 300 mJ/cm² at a wavelength of 365 nm by employing a photo mask having a predetermined light shielding layer pattern. Thereafter. the material is developed in an alkali aqueous solution of pH 11.5 and baked at 200° for 60 minutes, thereby forming the light shield layer 36 having a film thickness of 2.0 μm. Subsequently, ultraviolet ray hardening acrylic resin resist CR-2000™ (made by Fuji-Hunt Electronics Technology Co., Ltd.) with a dispersion of a red pigment is coated over the whole surface by use of the spinner. A predetermined area for forming the pillar-shaped spacer and a predetermined area for forming the red-colored portion are irradiated on the order of 100 mj/cm² at a wavelength of 365 nm through such a photo mask for forming a red filter as to irradiate these areas with light beams. Effected then is a development in KOH 1% aqueous solution for 10 sec, whereby a red-color layer 32R and one layer 33R of three-layered structured pillar-shaped spacer 33 are formed. Herein, although the outer peripheral portion of the substrate is cut off, the pillar-shaped spacer 33 is disposed also in the portion that is to be cut off (see FIG. 4). With this arrangement, there must be such an effect that a cell gap defect is hard to occur when bonded.

For Green and Blue color layers 32G and 32B are repeatedly disposed in the portion where color layers are to be provided and color layers 22G, 32B are repeatedly formed in the portion where the pillar-shaped spacer 33 is to be provided by repeating the same processes. Then, these color layers are respectively baked at 230° for 60 minutes. The color layers 32R, 32G, 32B and the pillar-shaped spacer 33 are thus formed. Herein, a green coloring material involves the use of CB-2000™ (Fuji-Hunt Electronics Technology, Co., Ltd.).

At this time, a film thickness of each of the red-, green and blue-color layers 32R, 32G and 32B are set to 1.5 μm. A pillar diameter of the pillar-shaped spacer is 10 μm at 33R, 13 μm at 33G and 16 μm at 33B so that the diameter becomes larger with upper layers. With this arrangement, the pillar-shaped spacer 33 takes an inversely-tapered shape, and, since the common electrode 34 is hard to stick to the side surface of the pillar-shaped spacer 33 when the common electrode 34 is covered over the entire surface of the substrate, a possibility of being electrically conductive to the active matrix substrate 10 extremely decreases.

The density of the number of pillar-shaped spacers is approximately 30 per 1 mm² in the display area and approximately 60 per 1 mm² in the off-display area in this embodiment. At this time, the pillar-shaped spacer 33 is disposed on the light shielding layer 36. Further, the pillar-shaped spacer 33 disposed in the display area is so disposed as to be located on the gate line 12 or the signal line 18 when bonded to the active matrix substrate 10, and is so disposed as to be located on the dummy pattern 22 to adjust the height in the off-display area.

The pillar-shaped spacer 33 in this embodiment is disposed on the gate insulating film 14 and on the signal line 18 in the display area, and disposed on the gate line 12 and on the dummy pattern 22 of the gate insulating film 14 in the off-display area. Note that the pillar-shaped spacer becomes an obstacle enough to produce a rubbing shadow area due to a rubbing process which will be effected afterward, and hence some consideration about how the pillar-shaped spacer 33 is disposed, is given so that the shadow portion is within the area of the light shielding layer 36 and is located to exert no influence upon the display.

If the pillar-shaped spacer 33 is formed simultaneously with the color layer 32 as in this embodiment, the number of steps of forming the spacer can be reduced by one but may be formed otherwise by use of a resin containing no pigment after providing the color layer without being formed simultaneously with the color layer. More specifically, the ultra-violet ray hardening acrylic resin resist containing no pigment is coated on the entire surface by the spinner, and a desired area for forming the spacer is irradiated on the order of 100 mJ/cm² at a wavelength of 365 nm through such a photo mask as to irradiate that area with light beams. Effected then is a development in KOH 1% aqueous solution for 30 sec, whereby the spacer 33 can be also formed.

Thereafter, an ITO (Indium Tin Oxide) film is deposited as a common electrode 34 by the sputtering method to have a thickness of 1500 Å.

Deposited thereon is, e.g., a polyimide film, and an orientation film 35 is deposited by executing the rubbing process, thus completing the opposite substrate 30.

Next, the sealing material 37 is printed in portions other than the filling port along the periphery of the orientation film 35 on the opposite substrate 30.

Next, the orientation film 21 on the active matrix substrate 10 is disposed in the face-to-face relationship with the orientation film 35 on the opposite substrate 30 and superposed to make an angle of 90° in the orientation directions. Then, the sealing material 37 is hardened by heating, and those orientation films are bonded.

Next, an empty cell is placed in vacuum, and the liquid crystal 40 is allowed to permeate by gradually setting the vacuum state back to an atmospheric pressure in a state where the filling portion is filled with the liquid crystal material.

Figure 4:
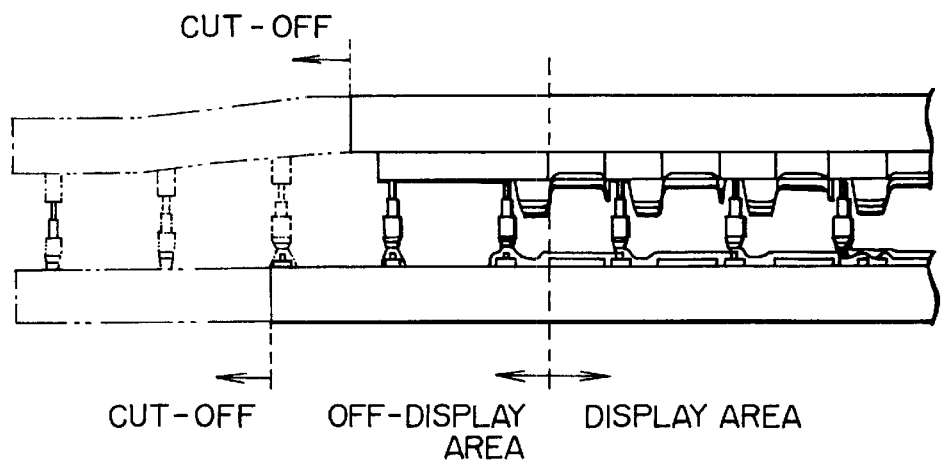
FIG. 4 is a sectional view of the liquid crystal display device in the first embodiment of the present invention, showing a dummy pattern and a pillar-shaped spacers provided in a cut-off area of a substrate outer peripheral portion.

Then, as shown in FIG. 4 a desired liquid crystal display device in this embodiment can be obtained by cutting off the outer peripheral portion of the substrate.

Figure 5:
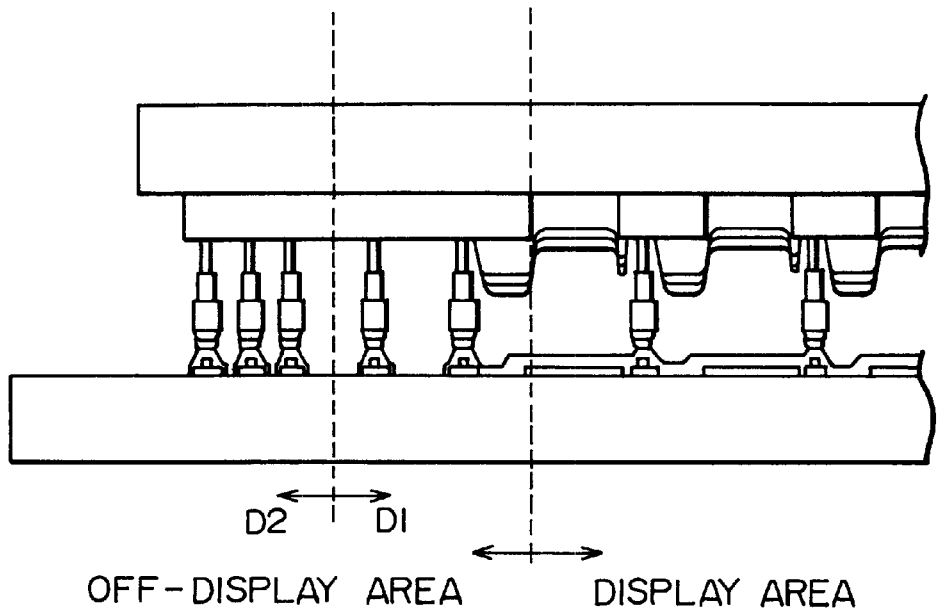
FIG. 5 is a sectional view illustrating the liquid crystal display device in a second embodiment of the present invention.

Next, a second embodiment will be described with reference to FIG. 5. In accordance with the second embodiment, a construction itself of the liquid crystal is the same as that in the first embodiment. However, the density distribution of the pillar-shaped spacers 33 is varied. That is, the off-display area on the opposite substrate in the first embodiment is divided into two subareas, i.e., a subarea (D1) close to the display area and a subarea (D2) far from the display area. The density of the number of pillar-shaped spacers 33 is increased stepwise such as being set to approximately 30/1 mm² in the display area, approximately 45/1 mm² in the subarea D1, and about 60/1 mm² in the subarea D2.

Note that the density may be gradually increased as it gets far from the display area without definitely dividing the area as in the case of being divided into the subareas D16, D2.

In accordance with the second embodiment, it is feasible to prevent an occurrence of vacuum bubbles in the vicinity of the display area, which are easy to produce due the enhancement in terms of the density of the number of pillar-shaped spacers 33 and to reduce the cell gap defect.

Figure 6:
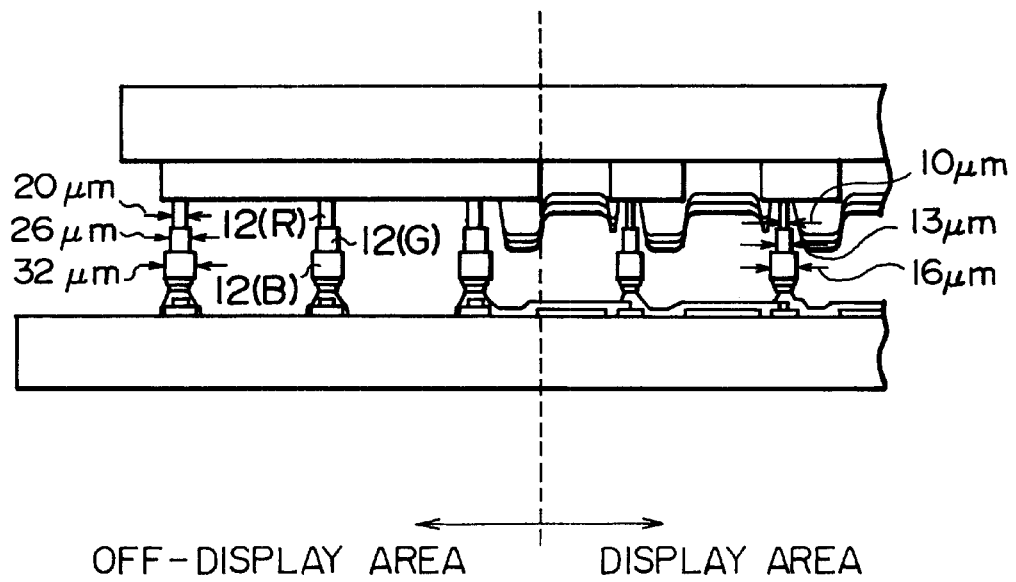
FIG. 6 is a sectional view showing, the liquid crystal display device in a third embodiment of the present invention.

A third embodiment will be explained with reference to FIG. 6. In the third embodiment also, the basic structure of the device is the same as that in the first embodiment. However, a volume of the pillar-shaped spacer 33 changed depending on the display area and the off-display area. That is, in the case of the liquid crystal device, the two substrates are disposed substantially in parallel, and an inter-substrate distance is fixed. Therefore, changing the volume of the pillar-shaped spacer has substantially the same meaning as changing the thickness of the pillar-shaped spacer. This can not, however, apply in such a case that the pillar-shaped spacer takes a tapered shape and has the thickness varied midways.

According to the third embodiment, a diameter of the red color layer 33R partly constituting the pillar-shaped spacer 33 is set to about 10 µm, a diameter of the green color layer 33G is set to about 13 µm, and a diameter of the blue color layer 33B is set to about 16 µm, thus setting the thickness of the pillar-shaped spacer 33 in the display area. The diameter of 33R is about 20 µm, the diameter of 33G is about 26 µm, and the diameter of 33B is about 32 µm, thus setting the thickness thereof in the off-display area.

Figure 7:
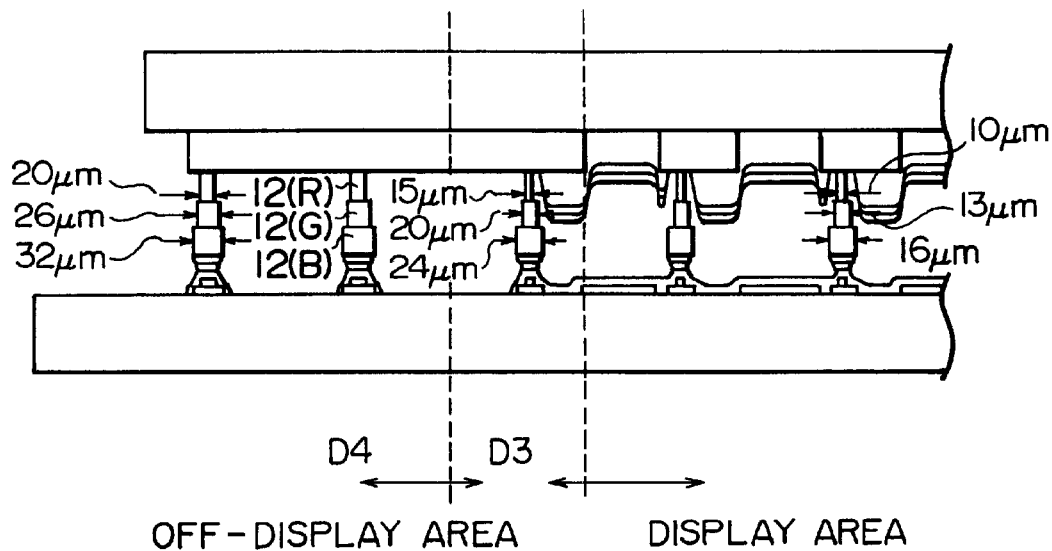
FIG. 7 is a sectional view illustrating the liquid crystal display device in a fourth embodiment of the present invention.

A fourth embodiment will be described with reference to FIG. 7. In the fourth embodiment, the off-display area is divided into two subareas, i.e., a subarea (D3) close to the display area and a subarea (D4) far from the display area. The diameter of 23R partly constituting the pillar-shaped spacer 33 is set to about 10 µm, the diameter of 33G is set to about 13 µm, and the diameter of 33B is set to about 16 µm, thus setting the thickness of the pillar-shaped spacer 33 in the display area. The diameter of 33R is about 20 µm, the diameter of 33G is about 26 µm, and the diameter of 33B is about 32 µm, thus setting the thickness thereof in the off-display area.

Figure 8:
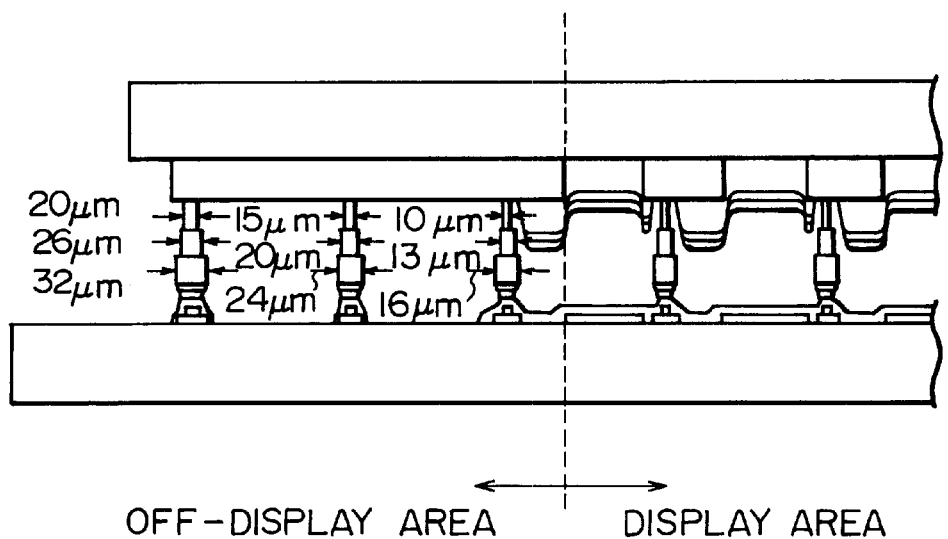
FIG. 8 is a sectional view of the liquid crystal display device in a modification of the fourth embodiment of the present invention.

Note that the diameter may be gradually increased as it gets far from the display area as shown in FIG. 8 without definitely dividing the area as in the case of being divided into the subareas D3, D4.

Each of the embodiments discussed above provides the active matrix liquid crystal display device using the TFT active matrix substrate having such a structure that the light shielding layer is disposed on the opposite substrate. The present invention is, however, applicable also to a liquid crystal display device structured such that the light shielding layer is disposed on the active matrix substrate. In this case, the substrate formed with the pillar-shaped spacer may be different from the substrate formed with the light shielding layer.

Further, the TFT structure is not confined to the reverse stagger type as in this embodiment but is applicable to a simple matrix liquid crystal device provided with stride-shaped electrodes on the upper and lower substrates.

According to the present invention, it is feasible to provide the liquid crystal display device at low costs, exhibiting a high display performance, wherein a deteriorated yield due to the cell gap defect caused when bonded is improved.

Figure 9:
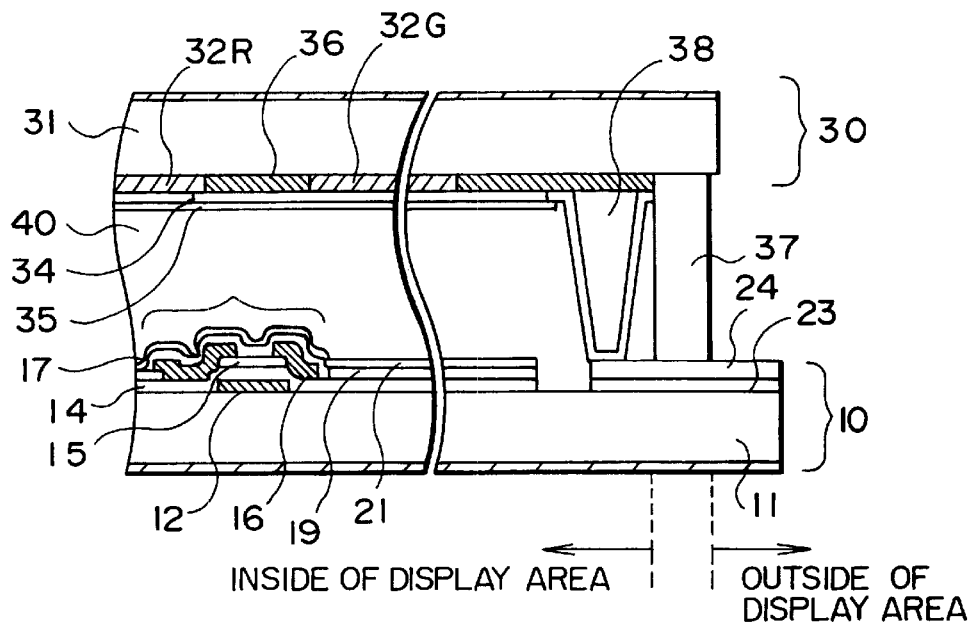
FIG. 9 is a sectional view of the liquid crystal display device in a fifth embodiment of the present invention, showing a pillar-shaped spacer having a transfer function.
Figure 10:
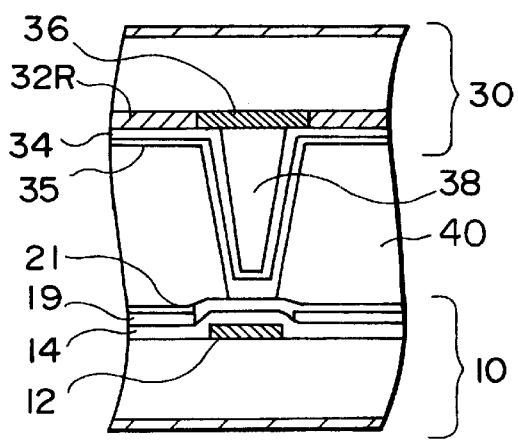
FIG. 10 is a sectional view illustrating the pillar-shaped spacer incorporating no transfer function.

FIGS. 9 and 10 are sectional views illustrating a fifth embodiment of the present invention.

This liquid crystal display device is constructed in such a way that the active matrix substrate 10 and the opposite substrate 30 are, as in the first through fourth embodiments, disposed facing to each other, and the gap herebetween is filled with the liquid crystal 40. In the following discussion, the same components as those in the embodiments discussed above are marked with the like reference numerals, and detailed explanations thereof are omitted.

A leading electrode 23 for supplying the opposite substrate 30 with the electric power is disposed on the surface of the outermost edge of the active matrix substrate 10, and an aluminum film 24 is disposed thereon. The sealing material 37 is disposed on the aluminum film 24. The interior of the display area is defined as being inwardly of the sealing material, and the exterior of the display area is defined as being outwardly of the sealing material. This definition is the same as the embodiments discussed above.

Next, the configuration of the opposite substrate is the same as those in the first to fourth embodiments. Referring to FIG. 9. A pillar-shaped spacer functioning as a transfer is provided inwardly of the display area in the vicinity of the sealing material 37. This pillard-shaped spacer 38 assumes a truncated cone having such a tapered shape that the diameter becomes lager toward the glass substrate 31 but smaller toward the tip. Then, the common electrode 34 is provided on the surface, but no orientation film is disposed. As a result, the pillard-shaped spacer 38 electrically contacts the leading electrode 23 of the active matrix substrate 10. FIG. 10 illustrates the spacer 3 that does not function as the transfer. This spacer 33 is provided corresponding to the gate line. In this case, the orientation film 35 is disposed on the surface of the spacer 33, resulting in an electrically non-conductive state.

The liquid crystal display device having the above construction is manufactured substantially in the same processes as those in the first embodiment, and only different points will be explained.

To begin with, the active matrix substrate 10 is manufactured such that there are formed the gate line 12, the unillustrated storage capacitance line and the leading electrode 23 for transfer, which is integral with the storage capacitance line at an outer edge of the display area. Deposited thereon by the plasma CVD method is SiOx to have a thickness on the order of 4000 Å, thereby forming the gate insulating film 14. Deposited thereon is the semiconductor layer 15 composed of a-Si (amorphous silicon) by the plasma CVD method, and the patterning is effected in a predetermined configuration. Further, there is formed an electrode composed of Mo/Al/Mo through the n+ a-Si ohmic contact layer, and then the patterning is executed in desired configurations, thereby forming the source electrode 16, the drain electrode 17 and an unillustrated signal line. Although the aluminum film 24 is disposed on the leading electrode 23, the Mo/Al/Mo layer defined as the electrode material layer may also be formed. A layer on the leading electrode has such an advantage that a height of the spacer can be adjusted.

Next, the pixel electrode 19 is formed by patterning in such a way that ITO serving as the transparent electrode contacts the source electrode 16. Finally, a polyimide resin film is formed, and the rubbing process is conducted, thereby forming the orientation film 21. However, the orientation film 21 is not covered over the area contacting the pillar-shaped spacer 38 which functions as a transfer on the side of the opposite substrate 30, and the leading electrode 23 is exposed.

Next, the respective color layers are the formed on the opposite substrate absolutely in the same way with the first embodiment.

After forming the color layers, the ultraviolet ray hardening acrylic resin containing no pigment is coated over the whole surface by use of the spinner. A predetermined area is irradiated on the order of 100 mJ/cm$^2$ at a wavelength of 365 nm through such a photo mask for forming the pillar-shaped spacer 38 as to irradiate this area with light beams. Effected then is a development in KOH 1% aqueous solution for 30 sec, whereby the pillar-shaped spacer 38 having a height of about 4 μm. According to such a forming method, the pillar-shaped spacer 38 can be formed in the tapered shape. The pillar-shaped spacer 38 formed within the display area at this time is so disposed as to be located on the light shielding layer 36 as illustrated in FIGS. 9 and 10. Note that there might be a possibility in which the pillar-shaped spacer 38 becomes an obstacle enough to produce a rubbing shadow area due to the rubbing process which will be effected afterward, and hence it is required that some consideration about how the pillard-shaped spacer 33 is disposed, be given so that the shadow portion is within the area of the light shielding layer 36 and is located to exert no Influence upon the display.

Further, the pillar-shaped spacer functioning as a transfer is provided in such a position that the pillard-shaped spacer contacts the leading electrode 23 when the active matrix substrate 10 is combined with the opposite substrate.

Note that the pillar-shaped spacer 38 functioning as the transfer may be provided inwardly of the display area as shown in FIG. 9 or in the off-display area.

Thereafter, the ITO (Indium Tin Oxide) film is deposited as a common electrode 34 by the sputtering method to have a thickness of 1500 Å. Herein, the pillar-shaped spacer 38 is formed in the tapered shape, and therefore the ITO film can be covered uniformed over the pillar-shaped spacer 38.

Deposited thereon is, e.g., polyimide, and the orientation film 35 is deposited by executing the rubbing process, thus completing the opposite substrate 30.

After this processing, the sealing material is printed on the side of the opposite substrate 30, and the active matrix substrate 10 and the opposite substrate 30 are disposed to make a angle of 90° in their orientation directions. Then, the sealing material 37 is hardened by heating, those substrates are bonded, and the liquid crystal 40 permeates therebetween, thus obtaining a desired liquid crystal display device as in the first embodiment.

As described above, the transfer function is given to the spacer, and therefore the necessity for separately providing the transfer is eliminated.

Note that this embodiment has the structure in which the light shielding layer is provided on the opposite substrate. The present invention is, however, applicable to a liquid crystal display device structured such that the light shielding layer is provided on the side of the active matrix substrate. In this case, the substrate formed with the pillar-shaped spacer is separate from the substrate formed with the light shielding layer.

Further, this embodiment provides the active matrix liquid crystal display device using the TFT active matrix substrate. The TFT structure is not, however, confined to the reverse stagger type as in this embodiment but is applicable to the simple matrix liquid crystal device provided with stripe-shaped electrodes on the upper and lower substrates.

Figure 11:
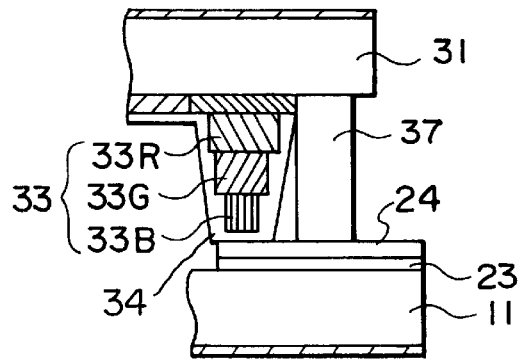
FIG. 11 is a view illustrating the pillar-shaped spacer incorporating the transfer function and constructed by stacking a plurality of color layers in a sixth embodiment of the present invention.

FIG. 11 is a sectional view illustrating a sixth embodiment of the present invention, wherein the pillard-shaped spacer 33 is constructed of the color layers 33R, 33G and 33B stacked on each other. The common electrode 4 is disposed on the surface of the thus stacked pillard-shaped spacer 33, but no orientation film is deposited.

The method of manufacturing the above stacked pillard-shaped spacer is absolutely the same as the method explained in the first embodiment, and hence its explanation is omitted.

As explained above, according to the present invention, the transparent electrode is covered over the pillar-shaped spacer, and the predetermined pillar-shaped spacer serves as a transfer between the upper and lower substrates, whereby the transfer forming step can be omitted. That is, the display quality can be enhanced because of the reduction in costs owing to unnecessariness for the transfer forming step and because of no mixture of impurities when working in the conventional transfer forming step.

Further, the pillar-shaped spacer is constructed by stacking the color layers and used as a transfer, thereby making it possible to decrease the number of steps.

FIG. 12 is a sectional view showing the active matrix liquid crystal display device in accordance with a seventh embodiment of the present invention. In the following discussion, the same components as those in the embodiments shown in FIGS. 1–11 are marked with the like numerals, and detailed explanations thereof are omitted.

This liquid crystal display device has such a structure that the active matrix substrate 10 including the reverse-stagger structured TFT explained in FIG. 3 and the opposite substrate 30 are disposed in parallel, and the liquid crystal 40 permeates therebetween and is sealed by the sealing material (not shown). A pillar-shaped spacer 33 is provided in an area formed with the light shielding film 36 on the opposite substrate 30, and its tip contacts the TFT portion of the active matrix substrate 10 or a wiring portion of a signal line 18 or the like.

FIGS. 13A and 13B show examples of configuration of the pillar-shaped spacer 33. FIG. 13A is a perspective view illustrating the pillar-shaped spacer 33. FIG. 13B is a side view thereof. In this example, the pillar-shaped spacer 33 is formed in a triangular cone and is contrived so that a bottom surface or an apex angle or an apex portion contacts at first staples of a rubbing cloth in the orientation direction so as to squeeze in the staples of the rubbing cloth with a less resistance. further, as illustrated in FIG. 13B, the pillar-shaped spacer 33 assumes a configuration including an oblique surface so that the height gradually increases in a rubbing advancing direction with arrows, and is contrived not to damage the staples of the rubbing cloth by reducing a frictional resistance and an entanglement. Incidentally, referring to FIGS. 13A and 13B, the bottom surface of the spacer is directed on the side of the substrate 31, and this is the same in other configurational examples of the spacer which will be mentioned later.

The method of manufacturing the above liquid crystal display device is substantially the same as the method explained in the embodiment shown in FIG. 1, and hence only the portion relative to the formation of the spacer 33 on the opposite substrate will be explained.

The ultraviolet ray hardening acrylic resin resist containing no pigment is coated over the entire surface by the spinner. and a desired area, on the light shielding layer, for forming the spacer is irradiated on the order of 100 mJ/cm$^2$ at a wavelength of 365 nm through such a photo mask as to irradiate that area with light beams. Effected then is a development in KOH 1% aqueous solution for 30 sec, thus forming the spacer 33.

At this time, the film thickness is 4 μm, and the development is performed somewhat intensively so that the base and the height take substantially an isosceles triangle. The spacer 33 assuming substantially the triangular shape is thus obtained.

Thereafter, the ITO film serving as the transparent electrode 34 is deposited by the sputtering method on the order of 1500 Å. Deposited thereon is the same orientation film material, and thereafter the rubbing process is executed, thus forming the orientation film 35. Note that the spacer 33 is formed before providing the transparent electrode 34, thereby obtaining an adhesion of the spacer 33.

The thus constructed color display type active matrix liquid crystal display device has a less stress on the rubbing cloth, and the staples of the rubbing cloth are never bent It is therefore feasible to prevent the display defect due to the rubbing and to obtain the liquid crystal display device exhibiting a high display performance and a high reliability.

Figure 14:
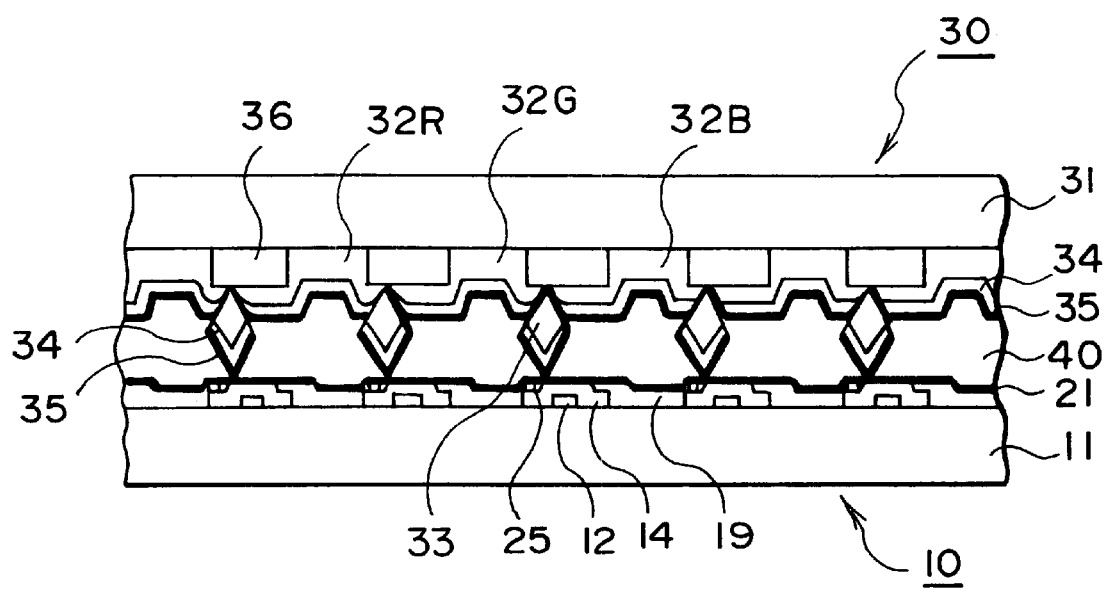
FIG. 14 is a sectional view schematically showing the liquid crystal display device in an eighth embodiment of the present invention.
Figures 15A, 15B:
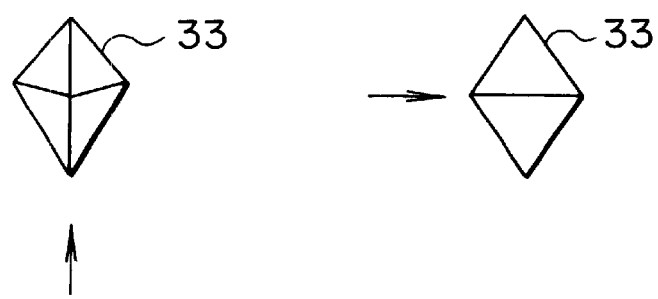
FIGS. 15A and 15B are explanatory views schematically showing a configuration of the spacer used in the embodiment of FIG. 14.

FIGS. 14, 15A and 15B show an eighth embodiment of the present invention. FIG. 14 is a sectional view illustrating a construction of the liquid crystal display device of the present invention. FIGS. 15A and 15B are schematic diagrams showing a spacer 33 used in the eighth embodiment. Referring to FIG. 14, the same portions as those in FIG. 12 are marked with the like numerals.

As obvious from FIG. 14, a structure thereof is such that the active matrix substrate 10 and the opposite substrate 30 are disposed in parallel, and the liquid crystal 40 permeates therebetween and is sealed by the sealing material (not shown). The pillar-shaped spacer 33 is provided in an area formed with the light shielding film 36 on the opposite substrate 30, and its tip contacts the TFT portion of the active matrix substrate 10 or a wiring portion of a signal line or the like.

FIGS. 15A and 15B show a configuration of the spacer 41, wherein the spacer 33, if the orientation direction is set as a coordinate axis, assumes a rhombus shape in section of the plane including this coordinate axis. The above configuration of the spacer 33 also has a tapered surface, wherein the apex angle is in such a position as to contact at first the staples of the rubbing cloth. Therefore, there is a small stress on the rubbing cloth, and the staples of the rubbing cloth are never forcibly bent. It is therefore possible to prevent the display defect due to the rubbing.

For forming the above spacer, the ultraviolet ray hardening acrylic resin resist containing no pigment is coated over the entire surface by the spinner to have the same thickness, and, for the first etching, a desired area, on the light shielding layer, for forming the spacer is irradiated on the order of 100 mJ/cm² at a wavelength of 365 nm through such a photo mask as to irradiate that area with light beams. Effected then is a development in KOH 1% aqueous solution for 30 sec. For the second etching is effected so that the spacer 33 takes an inversely tapered shape with a large side etching quantity. The thickness at this time is 4 μm, and the development is intensively effected to obtain a sharply tapered configuration. Thus, the rhombus spacer 33 is obtained.

Thereafter, the ITO film serving as the transparent electrode 34 is deposited by the sputtering method on the order of 1500 Å. Deposited thereon is the same orientation film material, and thereafter the rubbing process is executed, thus forming the orientation film 35. Note that the spacer 33 is, as in the embodiment shown in FIG. 12, formed before providing the transparent electrode 34, thereby obtaining an adhesion of the spacer 33.

The thus constructed color display type active matrix liquid crystal display device has the less stress on the rubbing cloth, and the staples of the rubbing cloth are never bent. It is therefore feasible to prevent the display defect due to the rubbing and to obtain the liquid crystal display device exhibiting a high display performance and a high reliability.

Figure 16:
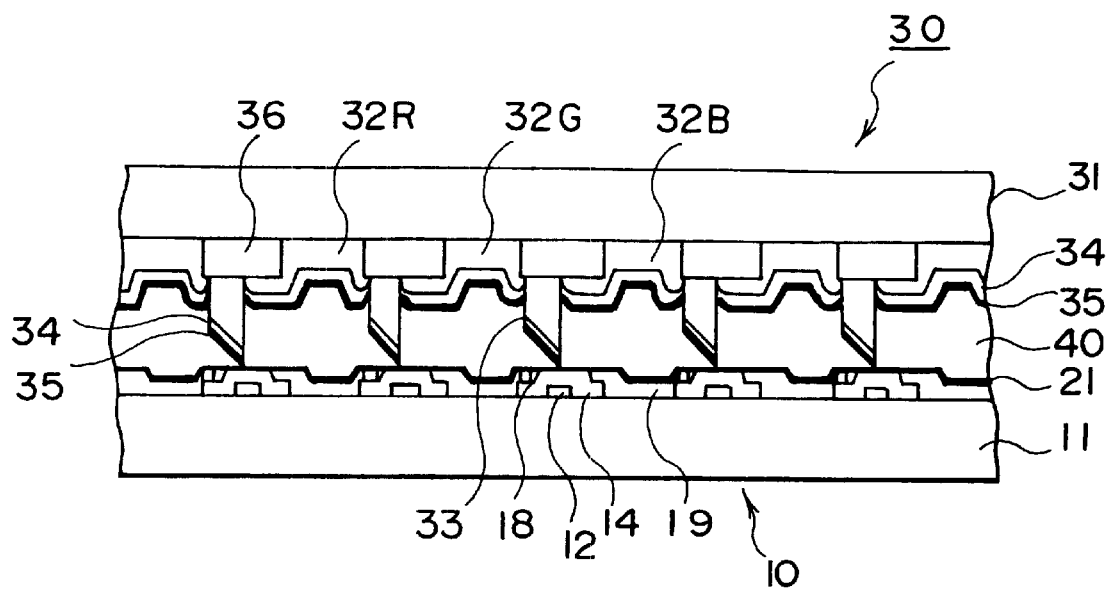
FIG. 16 is a sectional view schematically illustrating the liquid crystal display device in a ninth embodiment of the present invention.
Figures 17A, 17B:
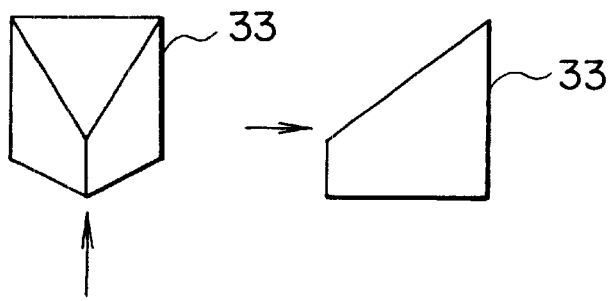
FIGS. 17A and 17B are explanatory views schematically showing a configuration of the spacer used in the embodiment of FIG. 16.

FIGS. 16, 17A and 17B show a ninth embodiment of the present invention. FIG. 16 is a sectional view illustrating a construction of the liquid crystal display device of the present invention. FIGS. 17A and 17B are schematic diagrams showing a spacer 33 used in the ninth embodiment. Referring to FIG. 16, the same portions as those in FIG. 12 are marked with the like numerals.

As obvious from FIG. 16, a structure thereof is such that the active matrix substrate 10 and the opposite substrate 30 are disposed in parallel, and the liquid crystal 40 permeates therebetween and is sealed by the sealing material (not shown). A pillar-shaped spacer 33 is provided in an area formed with the light shielding film 36 on the opposite substrate 30, and its tip contacts the TFT portion of the active matrix substrate 10 or a wiring portion of a signal line 18 or the like.

FIGS. 17A and 17B show a configuration of the spacer 33, wherein the spacer 33 takes such a configuration that an upper portion of a triangular pillar is cut off by a plane having an angle with respect to the bottom surface so that the cut portion is a triangle in section, and the spacer 33, if the orientation direction set as a coordinate axis, assumes a trapezoidal shape in section of the plane including this coordinate axis. The above configuration of the spacer 33 also has a tapered surface, wherein the apex angle is in such a position as to contact at first the staples of the rubbing cloth. Therefore, there is a small stress on the rubbing cloth, and the staples of the rubbing cloth are never forcibly bent. It is therefore possible to prevent the display defect due to the rubbing. Other configurations are the same with the embodiment shown in FIG. 12.

For forming the above spacer, the ultraviolet ray hardening acrylic resin resist containing no pigment is coated over the entire surface by the spinner to have the same thickness, and a desired area, on the light shielding layer, for forming the spacer is irradiated on the order of 100 mJ/cm² at a wavelength of 365 nm through such a photo mask as to irradiate that area with light beams. Effected then is a development in KOH 1% aqueous solution for 30 sec. The film thickness at that time is 4 μm.

Performed next is the similar irradiation on the order of 100 mJ/cm² at the wavelength of 365 nm by use of a gradation mask. Effected is the development in the KOH 1% aqueous solution for 30 sec, thereby forming the spacer 42 with only one side height being small.

Thereafter, the ITO film serving as the transparent electrode 34 is deposited by the sputtering method on the order of 1500 Å. Deposited thereon is the same orientation film material, and thereafter the rubbing process is executed, thus forming the orientation film 35. Note that the spacer 33 is formed before providing the transparent electrode 34, thereby obtaining an adhesion of the spacer 42.

The thus constructed color display type active matrix liquid crystal display device has a less stress on the rubbing cloth than in the embodiments 1 and 2, and the staples of the rubbing cloth are never bent. It is therefore feasible to prevent the display defect due to the rubbing and to obtain the liquid crystal display device exhibiting a high display performance and a high reliability.

Figure 18:
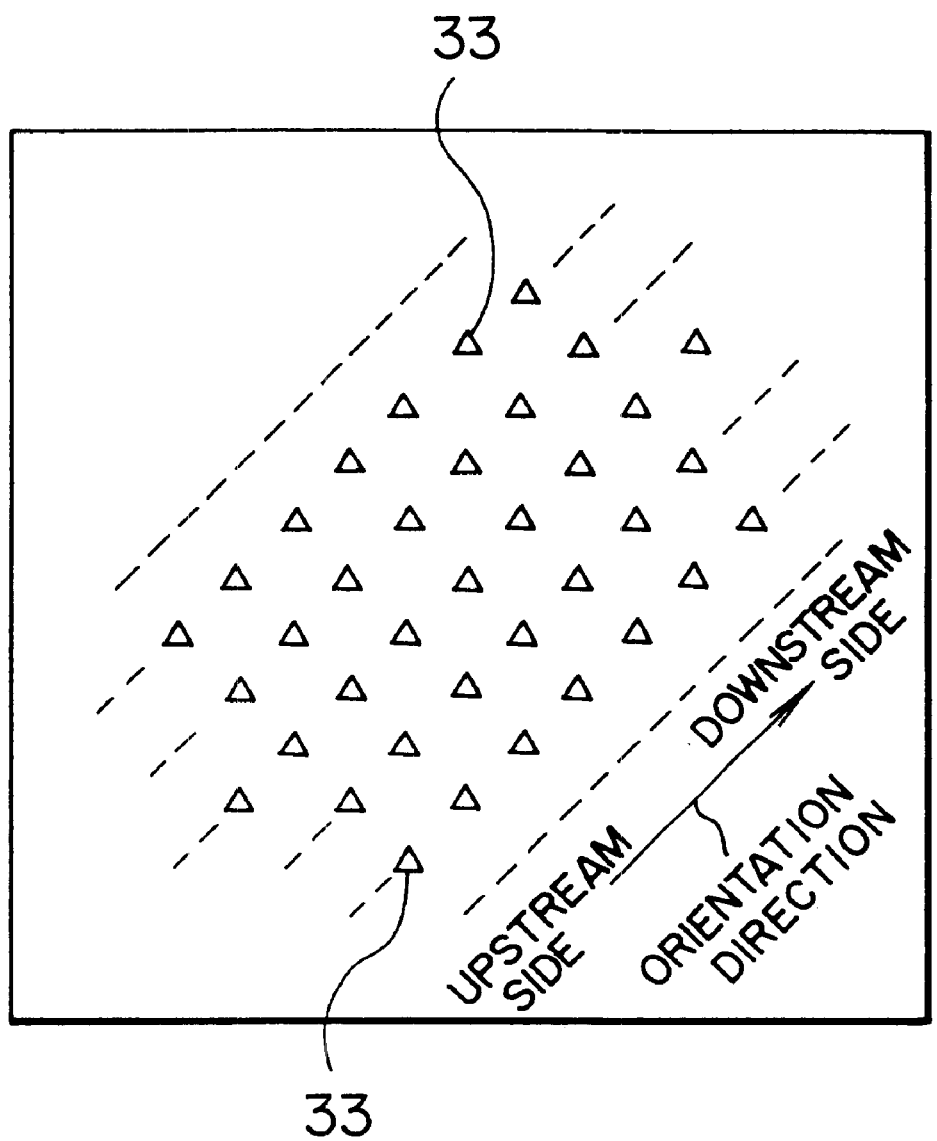
FIG. 18 is a plan view showing an arrangement of the spacers in the liquid crystal display device in a tenth embodiment of the present invention.

FIG. 18 illustrates a tenth embodiment of the present invention, wherein a plurality of spacers 33 in the seventh or ninth embodiment are arranged with their acute angle portions directed upstream in the orientation direction and disposed on the opposite substrate 30. If the spacers are thus arranged in the orientation direction, the resistance receiving the staples of the rubbing cloth becomes much smaller than arranged without considering the orientation direction. As a result, a life-span of the rubbing cloth elongates, and inconvenience in the rubbing process can be reduced.

As described above, according to the seventh through ninth embodiments of the present invention, the pillard-shaped spacer takes the configuration to reduce the damage (resistance) of the staples of the rubbing cloth in the rubbing process performed in one direction, e.g., substantially the isosceles triangle or the rhombus, and a start-of-rubbing portion is set to the apex of substantially the isosceles triangle or the rhombus, thereby reducing the stress on the rubbing cloth.

Further, the height of the spacer is set so that the start-of-rubbing portion is low as in the ninth embodiment, whereby the stress on the rubbing cloth can be reduced. Moreover, as shown in the tenth embodiment, the thus constructed spacers are arranged in the orientation direction, thereby making it possible to decrease the resistance receiving the rubbing cloth on the whole.

Figure 19:
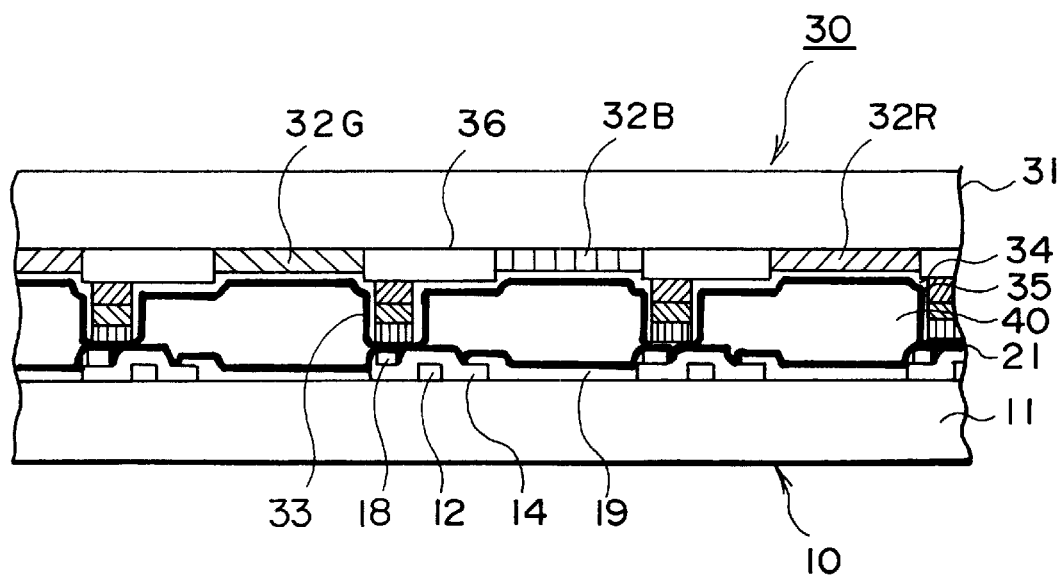
FIG. 19 is a sectional view schematically showing the liquid crystal display device in an eleventh embodiment of the present invention.
Figure 20:
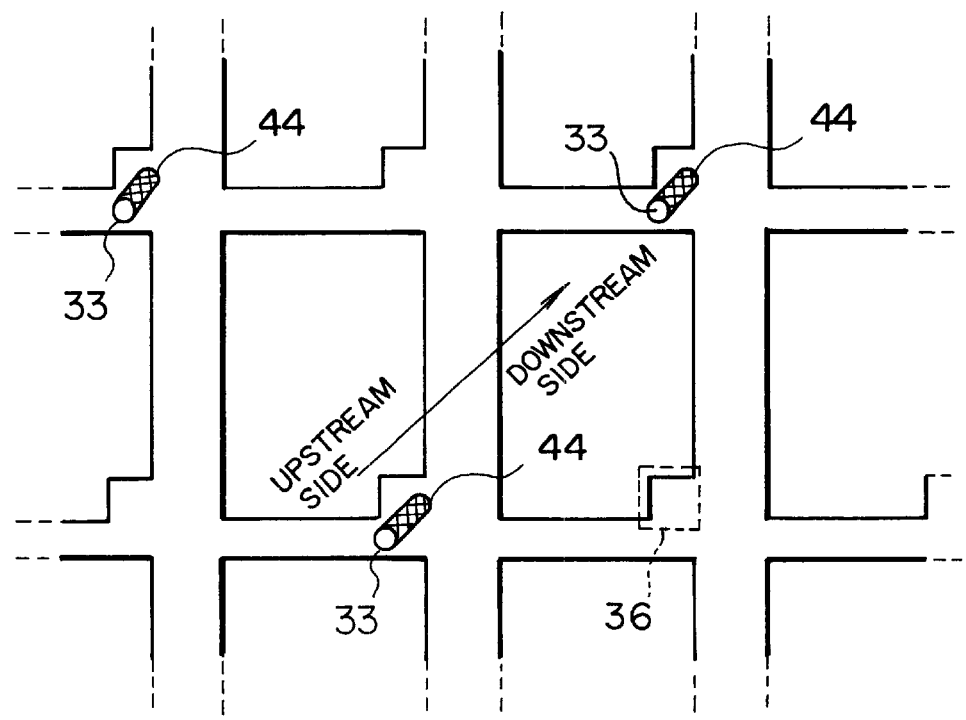
FIG. 20 is a plan view showing an example of arrangement of the spacers in the embodiment of FIG. 19.

FIGS. 19 and 20 show an eleventh embodiment of the present invention. FIG. 19 is a sectional view. FIG. 20 is a plan view.

FIG. 20 is the plan view of assistance in schematically explaining a relationship between a place where the spacer 33 is disposed and a orientation defective area 44. As can be understood from FIG. 20, the staples of the rubbing cloth are disordered by the spacer 33, and consequently an orientation scatter 44 starting from the spacer 33 is produced downstream in a orientation direction indicated by an arrow. Herein, the orientation direction is set at 45 degree to a longitudinal or lateral direction of the liquid crystal display device because of symmetrizing a field/angle display characteristic in the right and left directions. The spacer 33 is disposed upstream in the orientation direction of the TFT light shielding area 36, whereby the orientation scatter 44 can be absorbed within a non-influential portion upon the pixels by making use of the TFT light shielding area 36. As a result, it is possible to eliminate, from the display image, the influence of the orientation scatter produced due to a disorder of hyperfine grooves when the spacer contacts the staples of the rubbing cloth, and to enhance the display quality.

In this case, there no necessity for forming the spacer in a special configuration, and hence the spacer is composed of the same material as the color filter that constitutes the color liquid crystal display device and simultaneously formed, whereby the spacer can be disposed without increasing the number of steps.

FIG. 19 is a sectional view of the liquid crystal display device, showing an example of the liquid crystal display device including the stacked spacer 33 composed of the stacked color filters described above. The positions where the spacers are disposed in the liquid crystal display device are the same as shown in FIGS. 12, 14 and 16. The stacked spacer itself has the same layer structure as the structure shown in FIG. 1 and in FIG. 11. More specifically, the spacer 33 is constructed substantially in a pillar shape by stacking the red color layer 32R. the green color layer 32G and the blue color layer 32B. In this embodiment, however, the diameters of all the layers are the same. The spacer 343 can be formed simultaneously when forming the color layers, and this eliminates the necessity for the step of separately forming the spacer by use of the resist or the like.

Further, when paying attention to characteristics of the sense of sight of human being, and if the orientation defective area is not produced as much as possible in a green pixel area with a relatively high sensitivity in the case of comparing the three primary colors of the light, i.e., red, blue and green, the orientation defective area is not conspicuous in terms of the visual characteristics even when such a defective area is somewhat produced in the two areas, i.e., the red pixel area and the blue pixel area. Then, the decline in terms of the display quality can be restrained as much as possible by fixing the arrangement of the spacers so as not to be adjacent to the blue pixel area.

The method of manufacturing the liquid crystal display device in this embodiment is the same with the embodiments discussed so far, and its explanation is omitted.

In the liquid crystal display device of the present invention, the orientation defective area 44 due to the spacer 33 is disposed on the light shielding layer 36 for shielding the TFT. Hence, the liquid crystal orientation scatter 44 attributed to the spacer 33 is made invisible, and the uniform display can be actualized without a decline in terms of contrast due to a light leakage.

Further, in accordance with this embodiment, the light shielding layer 36, the color layers 32R, 32G, 32B and the spacer 33 are disposed on the opposite substrate 30 but may be disposed on the active matrix substrate 10. When the light shielding layer 36, the color layers 2R, 32G, 32B and the spacer 33 are disposed on the active matrix substrate 10, there is eliminated the necessity for an alignment between the opposite substrate 30 and the active matrix substrate 10, with the result that the high-quality liquid crystal display device can be manufactured at low costs.

Figure 21:
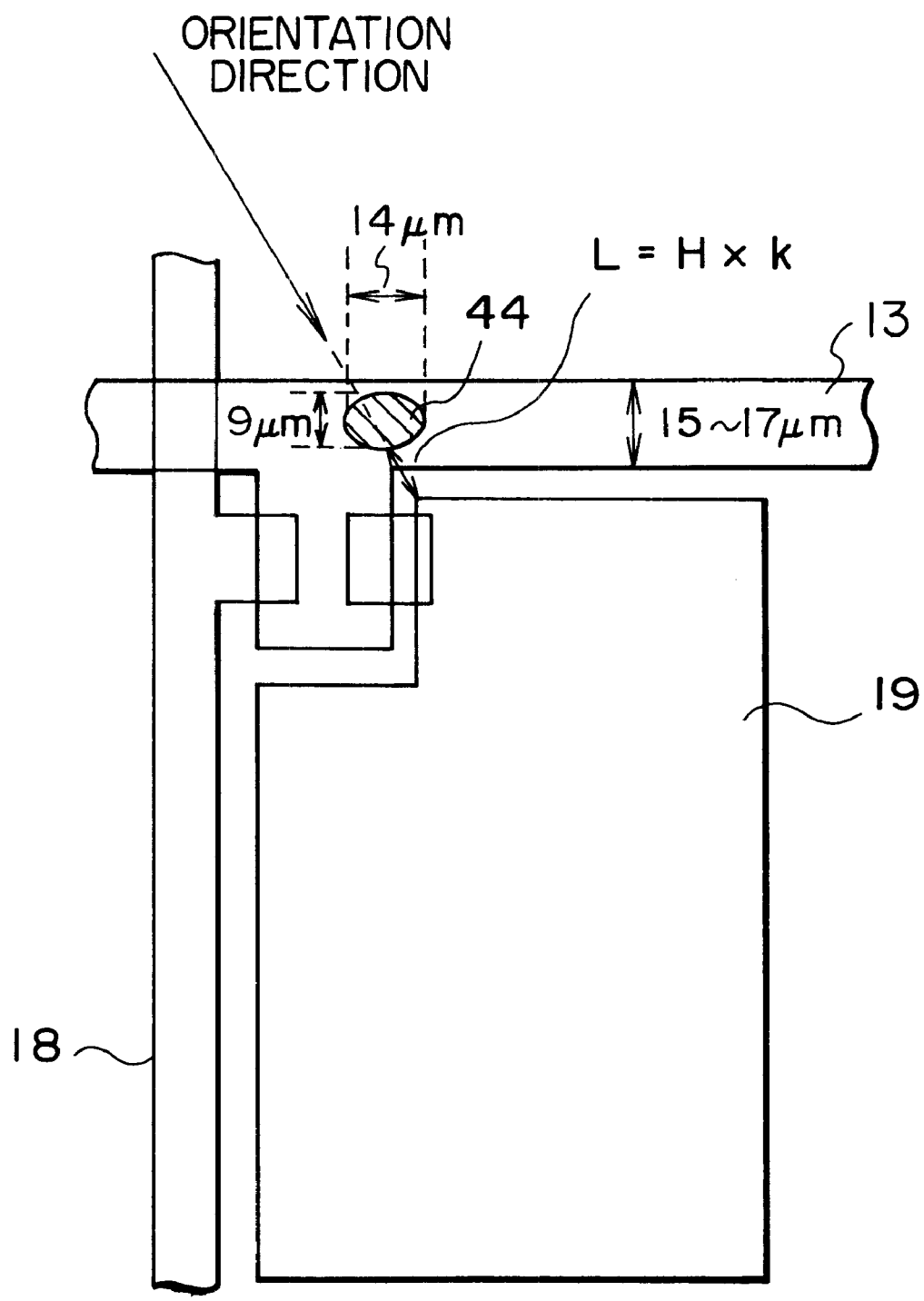
FIG. 21 is a view for reference in assistance of examining a condition for an orientation defect caused by the spacer to exert no influence upon a pixel.

Considered herein referring to FIG. 21 are conditions for the orientation defect due to the spacer when rubbed to exert no influence upon the pixel areas.

Referring to FIG. 21, a spacer 33 takes an elliptical shape having a minor diameter of 7 μm and a major diameter of 14 μm, and a width of the signal line is 15–17 μm. In this case, the orientation defective area does not reach the pixel area if the spacer 33 is spaced 5–10 μm away from the pixel electrode.

A distance L between the spacer 33 and the pixel electrode changes depending on a width of wire, a distance between the pixel electrode and the wire, a height of the spacer 33 and an orientation direction. It is, however, considered that the distance L satisfies the following formula on the downstream side on the line extension of the orientation direction:

$$L = H \times k$$

where H is the height of the spacer 33, and k is the width of the wire and is a coefficient (0.5–2) determined by the pixel electrode and a wire-to-wire distance.

Figure 22:
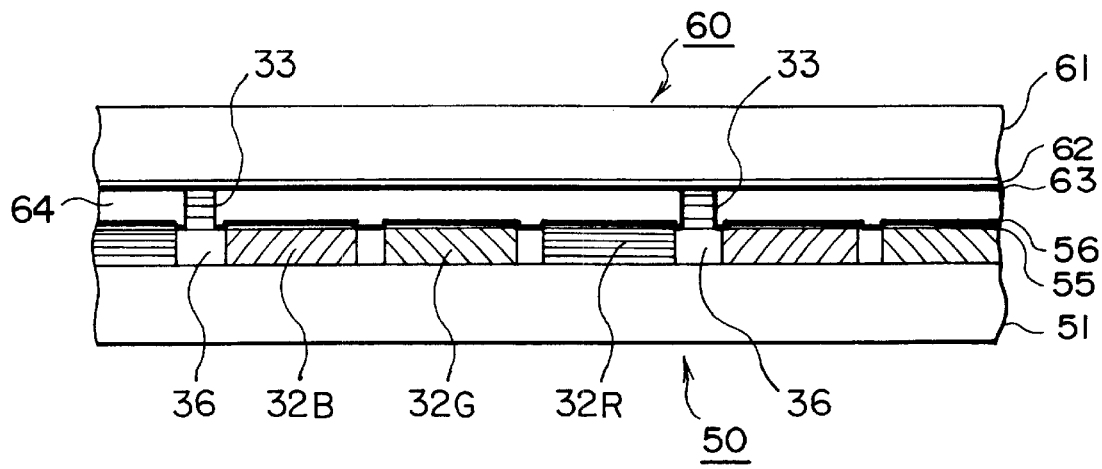
FIG. 22 is a sectional view schematically showing the liquid crystal display device in a twelfth embodiment of the present invention.
Figure 23:
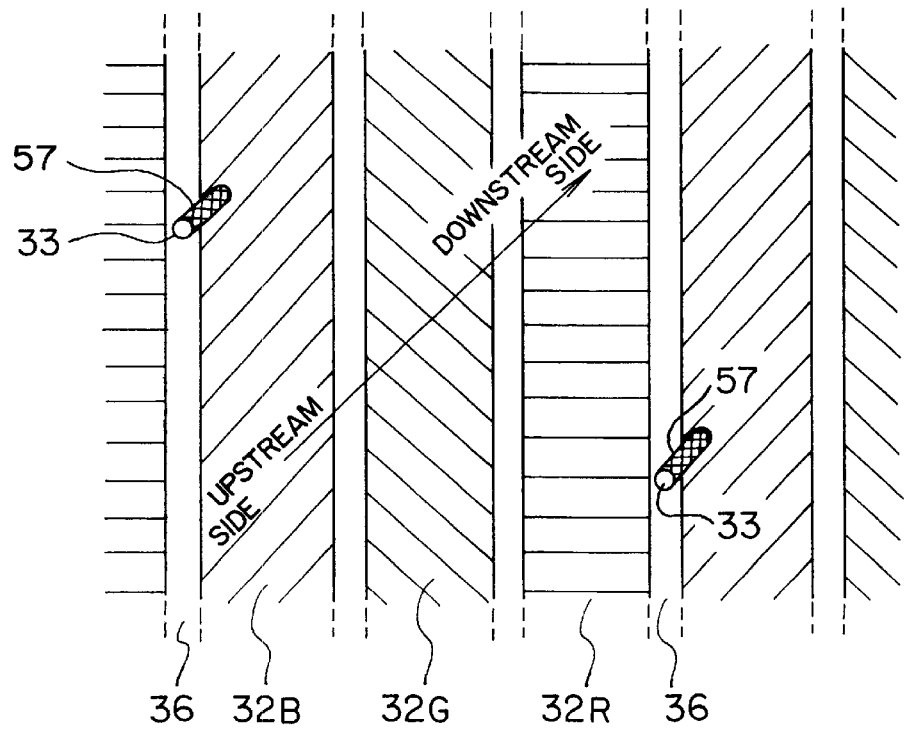
FIG. 23 is a plan view showing an example of arrangement of the spacers in the embodiment of FIG. 22.

FIGS. 22 and 23 are a sectional view and a plan view showing a twelfth embodiment, wherein the influence of the orientation film due to the spacer is not exerted upon a specified color layer.

As illustrated in FIG. 22, the twelfth embodiment adopts a simple matrix structure, wherein the color filter substrate having the spacer is disposed in a face-to-face relationship with the opposite substrate. A color filter substrate 50 includes the red color layer 32R, the green color layer 32G and the blue color layer 32B that are disposed in areas separated by light shielding layers 36 on the surface of the glass substrate 51, and the spacer 33 formed substantially in the pillar shape as a stacked body of the respective color layers is disposed corresponding to the light shielding layer 36. Further, a stripe electrode 55 is provided in the pixel area formed with the color layers, and an orientation film 56 is deposited over the whole.

Moreover, an opposite substrate 60 is structured such that a stripe electrode 62 and an orientation film 63 are disposed on a glass substrate 61.

These two substrates are disposed face-to-face manner so that the stripe electrodes 55 and 62 run perpendicular each other, and a liquid crystal material 64 permeates therebetween.

Given in this embodiment is some contrivance for the position where the spacer 33 is disposed. The spacer 33 is disposed in such a position that a green color layer 32B is not adjacent to the downstream portion of the spacer in the orientation direction indicated by an arrow in order for the orientation defective area 57 caused by the spacer 32G not to spread into the green color layer 33G. This arrangement intends to make the display inconvenience derived from the orientation defect inconspicuous as much as possible by causing the orientation defect in the color layers exclusive of the green color layer 32c, i.e., in the red color layer 32R and/or the blue color layer 32B, because a color sensitivity characteristic of the sense of sight of human being is high to green but comparatively low to blue and red.

FIG. 23 is a plan view of assistance in schematically explaining the relationship between the position where the above spacer 33 is disposed and the orientation defective area 57. As can be understood from FIG. 23, the staples of the rubbing cloth are disordered by the spacer 33, and consequently an orientation scatter 57 starting from the spacer 33 is produced downstream in a orientation direction indicated by an arrow. Herein, the orientation direction is set at 45 degree to a longitudinal or lateral direction of the liquid crystal display device because of symmetrizing the field/angle display characteristic in the right and left directions.

Then, the spacer 33 is disposed in such a position that the rubbing downstream area is the color layer other than the green color layer 32G. As a result, the influence of the orientation scatter is removed as much as possible from the display image. The construction described above is effective in a case where the light shielding area 36 is comparatively narrow in terms of the structure, and the orientation defective area is hard to absorb within the light shielding area.

The method of manufacturing the liquid crystal display device in this embodiment will be explained.

To start with, a color filter substrate 50 is manufactured in the following manner.

Photosensitive black resin is coated over the glass substrate 51 by use of the spinner and dried at 90° C. for 10 minutes. Thereafter, the dried resin is irradiated with the ultraviolet ray via the photo mask assuming a predetermined pattern shape with an exposure quantity on the order of 300 mJ/cm$^2$, subsequently developed in the alkali aqueous solution of pH=11.5, and baked at 200° C. for 60 minutes, thus forming a light shielding layer 36 having a film thickness of 1.5 ($\mu$m). Subsequently, photoresist CR-2000™ (made by Fuji-Hunt Electronics Technology Co., Ltd.) with a dispersion of a red pigment is coated over the whole surface by use of the spinner. After the drying process at 90° C. for 10 minutes, the exposure takes place with an exposure quantity of 100 mJ/cm$^2$ via such a photo mask that only the portion formed with the red color layer 32R is irradiated with the ultraviolet ray, including the spacer 33 in which an orientation scatter 57 starting from the spacer 33 is confined to only the blue colored pixel area. The development is executed in potassium hydroxide 1 wt % aqueous solution for 20 sec and baked at 200° C. for 60 minutes, thereby forming the red color layer.

Similarly, a color filter having a film thickness of 1.5 ($\mu$m) is composed of each of the color layers by repeatedly depositing the green and blue color layers 32G and 32B. The green and blue color layers are not, however, stacked to constitute the spacer 33, and the spacer 33 composed of only the red color layer is provided on the light shielding layer 36.

Herein, the green coloring material involves the use of CG-2000™ (made by Fuji-Hunt Electronics Technology Co., Ltd.). The blue coloring material involves the sue of a CB-2000™ (made by Fuji-Hunt Electronics Technology Co., Ltd.).

Thereafter, an ITO film serving as a stripe electrode 55 is formed to have a thickness on the order of 1500 Å by the sputtering method. Then, the ITO film is subjected to patterning in the stripe shape by use of the well-known photo lithography so that a line width is 80 ($\mu$m), and an interval is 20 ($\mu$m). Next, polyimide is coated to cover the entire surface of a stripe electrode 55, and thereafter the rubbing process is executed, thereby forming an orientation film 56.

Further, an opposite substrate 60 is manufactured in the manner which follows.

The ITO film serving as a stripe electrode 62 is formed on the glass substrate 61 to have a thickness on the order of 1500 Å by the sputtering method. Then, the ITO film is subjected to patterning in the stripe shape by use of the well-known photo lithography so that the line width is 80 ($\mu$m), and the interval is 20 ($\mu$m). Next, polyimide is coated to cover the entire surface of the stripe electrode 62, and thereafter the rubbing process is executed, thereby forming an orientation film 63.

After the color filter substrate 50 has been bonded to the opposite substrate 60, the liquid crystal material such as a ferroelectric liquid crystal or the like permeates between the two substrates, and polarizing plates (not shown) are bonded to surfaces opposite to the surfaces contacting the liquid crystal of the two substrates. Then, a light source (not shown) serving as a back light of this liquid crystal display device is provided outwardly of the polarizing plate side of the color filter substrate 50.

In the liquid crystal display device according to the present invention, the orientation defective area attributed to the spacer 33 is confined to the blue color pixel area, and therefore the liquid crystal orientation scatter 57 derived from the spacer is not visually conspicuous, and the high quality display can be obtained.

Figure 24:
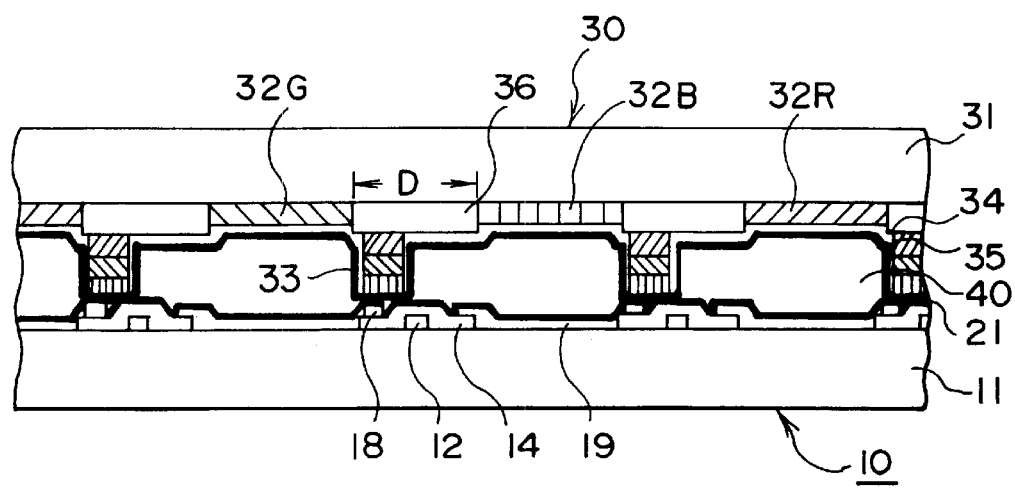
FIG. 24 is a sectional view schematically illustrating the liquid crystal display device in a thirteenth embodiment of the present invention.

FIG. 24 is a sectional view showing the active matrix liquid crystal display device, showing a thirteenth embodiment of the present invention. This construction is basically the same as that shown in FIG. 19, and hence the corresponding portions are marked with the like symbols with an omission of the detailed explanation thereof. the symbol D in FIG. 24 designates a width of the light shielding layer 36. Further, a spacer 33 provided on the opposite substrate assumes an elliptical shape having a major diameter $\underline{a}$, a minor diameter $\underline{b}$ and a height H as shown in a spacer perspective view of FIG. 26 as well as in a plan view of FIG. 25.

FIG. 27 is a Table for confirming a damage state of the spacer by executing such a rubbing process that the spacer is required to have a mechanical strength most in order to confirm the mechanical strength of the elliptical spacer.

The damage state is observed, wherein the height H of the spacer of the TFT-liquid crystal display device is set to 5 $\mu$m, the width D of the light shielding layer is set to 25 $\mu$m, and the major diameter $\underline{a}$ and the minor diameter $\underline{b}$ are set to a variety of values. The symbol ○ in the Table represents the spacer with no conspicuous flaw after the rubbing, the symbol Δ indicates the spacer with conspicuous flaw after the rubbing, and the symbol X represents the spacer with the conspicuous flaw after the rubbing. Note that the symbol ○ a double frame in the Table represents a portion wherein the major and minor diameters are revere in magnitude.

As a result, if the minor diameter $\underline{b}$ of the spacer is smaller than (2×H), the defect in the spacer is recognized in the rubbing step. Further, if the major diameter $\underline{a}$ and the minor diameter $\underline{b}$ have a relationship such as a>b. The spacers can be disposed to a length that is twice in terms of square root as large as the light shielding layer width D because the direction of the major diameter a of the spacer has the same (parallel) angle, i.e., 45 degrees as that made by the orientation direction. Therefore, a limit enough not to expand into the pixel area from the light shielding layer width D is given such as a<((2)1/2×D).

Accordingly, in the case of the active matrix liquid crystal device, the configurational condition for the elliptical spacer is given by:

(2×H)≦b<a≦((2)½×D)

In the case of the simple matrix liquid crystal display device, the condition is given by:

(2×H)≦b<a≦((2)½×W)

where W is the interval between the display electrodes.

Figure 25:
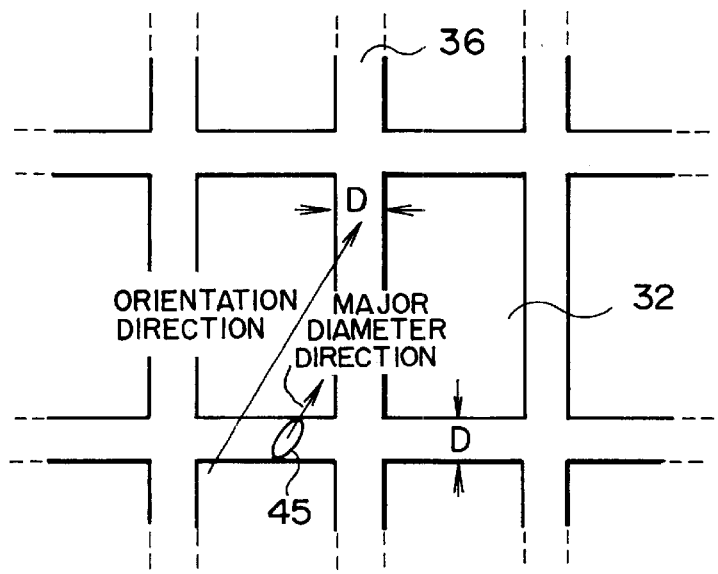
FIG. 25 is a plan view showing an example of arrangement of the spacers in the embodiment of FIG. 24.
Figure 26:
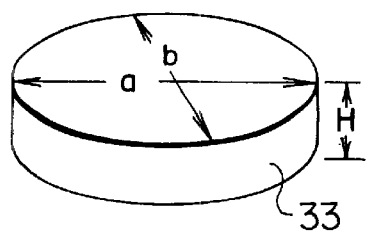
FIG. 26 is a perspective view showing a configuration of the spacer in the liquid crystal display device of the present invention.

Referring to FIG. 25, the direction of the major diameter of the spacer 33 of the opposite substrate 30 shown in FIG. 24 is coincident with the orientation direction (orientation direction), and there decreases a probability of being broken by the rubbing.

Figure 28:
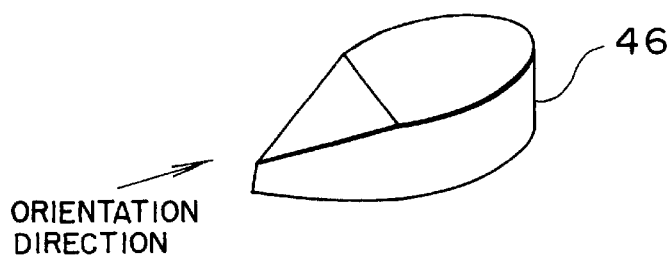
FIG. 28 is a perspective view showing an example where the configuration of the elliptical spacer shown in FIG. 26 is improved.

FIG. 28 is a perspective view further illustrating a configuration of a spacer 33 in a modification of the embodiment illustrated in FIG. 13 in consideration of reducing the damage to the rubbing cloth, wherein the spacer, although an elliptical pillar is a basic configuration, has an apex angle at a portion with which the rubbing cloth is firs. brought into contact and has also a tapered surface.

As described above, according to the liquid crystal display device in the twelfth and thirteenth embodiments, the spacer takes the elliptical pillar shape to enhance the spacer mechanical strength most in the rubbing step, and it is possible to minimize the load applied upon the spacer and to keep the spacer strength because of the major-diameter direction of the spacer being coincident with the orientation direction of the orientation film. If the minor diameter of the spacer is not, however, over twice the height of the spacer, the mechanical strength of the spacer is insufficient. Then, if larger than the width of the light shielding layer in the active matrix liquid crystal display device, and if larger than the interval between the display electrode in the simple matrix liquid crystal display device, the spacer enter the pixel, resulting in a decline in the display quality.

Further, an on-substrate distribution density of the spacers is an important factor in terms of accurately controlling the distance between the two substrates. For actualizing the substrate-to-substrate distance of approximately 1–10 ($\mu$m) that the normal liquid crystal display device needs to have, it is required that a sum of sectional areas of the surfaces of the spacers, parallel to the substrates, which occupy per a square millimeter should exceed 0.00002 square millimeter but be less than 0.005 square millimeter. If under 0.00002 square millimeter per one square millimeter, the mechanical strength is insufficient as the spacer, and it is difficult to uniformly precisely control the distance between the two substrates within the plane. Further, if over 0.005 square millimeter per one square millimeter, so-called "low temperature bubbling" (a vacuum area is produced because of a liquid crystal thermal expansion rate being larger than a thermal expansion rate of the liquid crystal display device and look like bubbles) produced when the liquid crystal display device is at a low temperature is easy to occur. Moreover, there arise troubles in which the liquid crystal is hard to permeate, and the display quality declines.

Furthermore, the spacer is composed of the same material as the color filter defined as a constructive material of the color liquid crystal display device and formed simultaneously, whereby the spacer can be disposed without increasing the steps, and the dispersion spreading step for the spacers (beads) needed in the conventional liquid crystal display device can be eliminated.

Further, the major-diameter direction of the spacer is set in such a direction that the liquid crystal is easy t uniformly permeate in the entire surfaces of the liquid crystal display device, and hence the permeation of the liquid crystal can be facilitated.

The liquid crystal display device in the twelfth and thirteenth embodiments is manufactured in substantially the same way as that in, e.g., the eleventh embodiment. However, only the spacer forming step is different and will be therefore explained in this respect.

In accordance with the twelfth embodiment, the photosensitive resist CR-2000™ (made by Fuji-Hunt Electronics Technology Co., Ltd.) with a dispersion of a red pigment is coated over the glass substrate 51 by use of the spinner. After being dried at 90° C. for 10 minutes, the exposure takes place with an exposure quantity of 100 mJ/cm$^2$ via such a photo mask that only the portion formed with the red color layer is irradiated with the ultraviolet ray, including the spacer 33 in which the minor diameter is 15 ($\mu$m), the major diameter is 25 ($\mu$m), the direction of the major diameter is parallel to the orientation direction of the orientation film, and a sum of sectional areas of the surfaces which occupy per a square millimeter is 0.0009 square millimeter. Next, the development is executed in potassium hydroxide 1 wt % aqueous solution for 20 sec and baked at 200° C. for 60 minutes, thereby forming the red color layer 32R.

Similarly, the green and blue color layers 32G, 32B are repeatedly formed, thereby obtaining the spacer 33 constructed of the color filters 32R, 32B, 32G each having a film thickness of 1.5 ($\mu$m) and only the red color layer 32R on the light shielding layer 36. In accordance with the thirteenth embodiment, a difference from the twelfth embodiment is that the color filters are provided on the opposite substrate as in the eleventh embodiment shown in FIG. 19. However, there may be such as photo mask as to similarly obtain a desired elliptical shape.

Note that the light shielding layer 36, the color filters 32 and the spacer 33 may be disposed on the active matrix substrate 10. In this case, there is no necessity for aligning the active matrix substrate 10 with the opposite substrate 30, and the high-quality liquid crystal display device can be manufactured at low costs.

Figure 29:
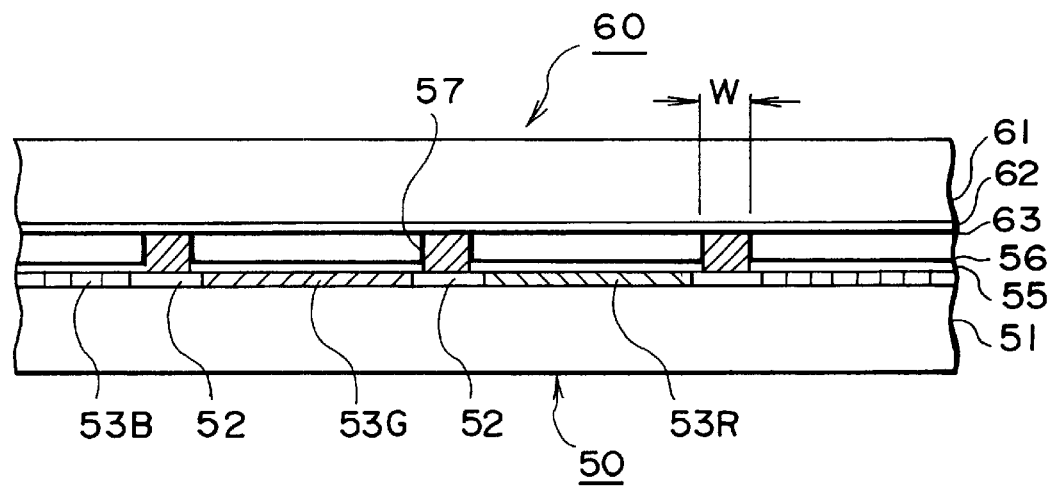
FIG. 29 is a sectional view schematically showing the liquid crystal display device in a fourteenth embodiment of the present invention.
Figure 30:
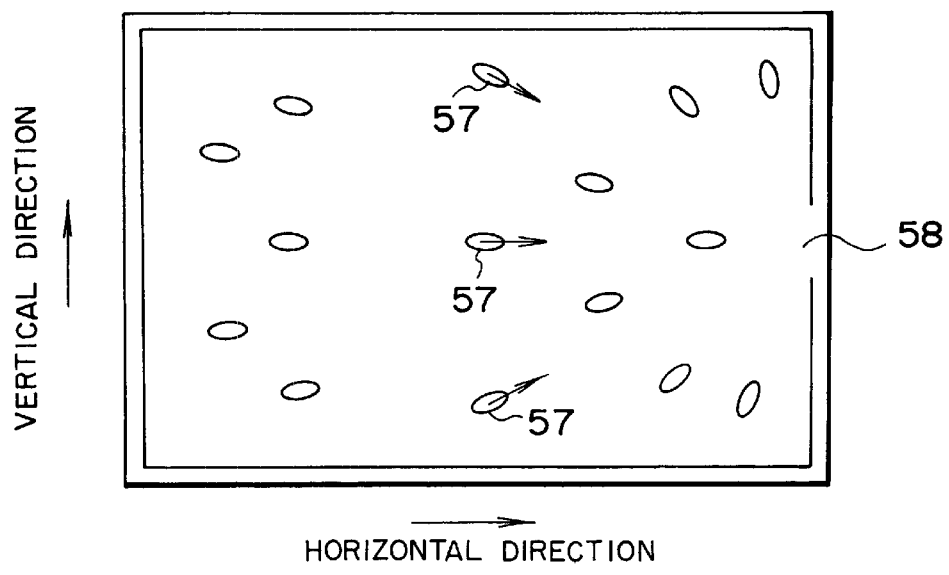
FIG. 30 is a plan view showing an example of arrangement of the spacers in the embodiment of FIG. 29.

FIGS. 29 and 30 are sectional views showing the liquid crystal display device in a fourteenth embodiment of the present invention. This liquid crystal display device is of the simple matrix type. The construction thereof is similar to that in FIG. 22, and therefore the corresponding portions are marked with the like symbols with an omission of the detailed explanation.

Referring to FIG. 29, the liquid crystal display device is constructed such that the color filter substrate including the spacer is disposed in the face-to-face relationship with the opposite substrate. The color filter substrate 50 is structured such that the red color layer 32R, the green color layer 32G and the blue color layer 32B are disposed in the areas separated by the light shielding layers 36 on the surface of the glass substrate 51, and the spacers 33 formed in the elliptical shape as a single layer or a stacked body of the color layers are disposed corresponding to the light shielding layers 36. Further, the stripe electrode 55 is provided in the pixel area formed with the color layer, and an orientation film 56 is depicted over the whole.

Moreover, the opposite substrate 60 is constructed such that the common electrode 62 and the orientation film 63 are provided on the glass substrate 61.

These two substrates are disposed face-to-face manner so that the stripe elecrodes 55 and 62 run perpendicular each other, and a liquid crystal material 40 permeates therebetween.

Referring again to FIG. 29, the symbol W represents an interval between the display electrodes on the same substrate and corresponds to the width D of the light shielding layer in FIG. 14.

Then, the spacer 33 is formed to establish $(2\times H) \leq b < a \leq ((2)1/2 \times W)$. As explained above, the symbol H is the height of the spacer, $\underline{a}$ is the major diameter of the spacer (ellipsoid), and $\underline{b}$ is the minor diameter of the spacer. Herein, the reason why the major diameter $\underline{a}$ of the spacer is allowed to set $(2)\frac{1}{2}$ times the interval W between the display electrodes is that a major diameter direction of the spacer is set between the display electrodes obliquely in the same 45-degree direction as an orientation direction. As will be mentioned later, however, it may happen the major diameter direction 43 of the spacer is set in a direction different from the orientation direction.

FIG. 30 is a plan view of assistance in explaining such a case, wherein the major diameter direction of the spacer 33 on the color filter substrate 50 of the liquid crystal display device is set toward a liquid crystal filling port 58. That is, the major diameter direction of the spacer 33 is set along an inflow direction of the liquid crystal material introduced via the liquid crystal filling port. More simply, the direction of the spacer 33 is set toward the liquid crystal filling port 58.

In this case, an angle θ of the major diameter of the spacer 33 is 0–45 degree to the longitudinal direction or the lateral direction of the matrix, and hence a dimensional condition of the configuration of each spacer 33 within this angular range is, in the case of the active liquid crystal display device, given by:

$$(2\times H) \leq b < a \leq ((1/\cos \theta) \times D)$$

and is, in the case of the simple matrix type, given by:

$$(2\times H) \leq b < a \leq ((1/\cos \theta) \times W)$$

For example, when θ=0 degree, $$(2\times H) \leq b < \leq W$$

and when θ=45 degrees, $$(2\times H) \leq b < a \leq ((2)1/2 \times w)$$

The method of manufacturing the liquid crystal display device in the fourteenth embodiment is the same as that in the twelfth embodiment shown in FIG. 22. However, after forming the black resin light shield film, the photosensitive resist CR-2000™ (made by Fuji-Hunt Electronics Technology Co., Ltd.) with a dispersion of a red pigment is coated over the whole surface by use of the spinner then, after being dried at 90° C. for 10 minutes, the exposure takes place with an exposure quantity of 100 mJ/cm² via such a photo mask that only the portion formed with the red color layer and the spacer 33 are irradiated with the ultraviolet ray, the spacer 33 being structured such that the spacer 33 has a size with the minor diameter of 15 ($\mu$m) and the major diameter of 25 ($\mu$m), the major diameter is directed toward the liquid crystal filling port 58, and a sum of sectional areas of the surfaces which occupy per a square millimeter is 0.0007 square millimeter. Thereafter, the development is executed in potassium hydroxide 1 wt % aqueous solution for 20 sec and baked at 200° C. for 60 minutes, thereby forming the red color layer. This process is different from the above-mentioned.

When the spacer 33 is composed of only the red color layer, thereafter the green and blue color layers are repeatedly formed, thereby forming the color filters 32R, 32G, 32B each having a film thickness of 1.5 ($\mu$m).

Figure 31:
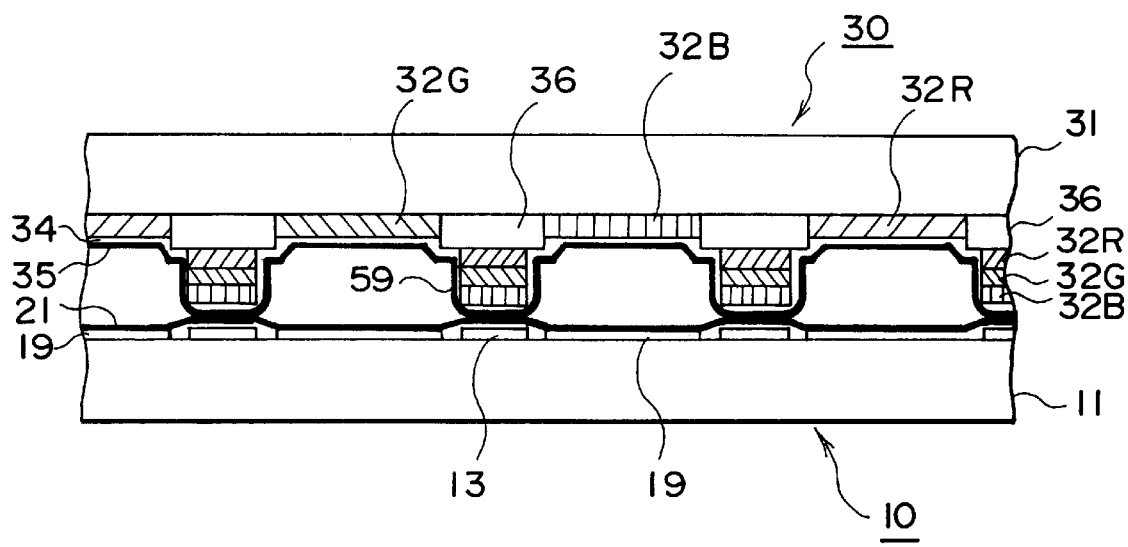
FIG. 31 is a sectional view schematically illustrating the liquid crystal display device using a rectangular spacer in a fifteenth embodiment of the present invention.
Figure 32:
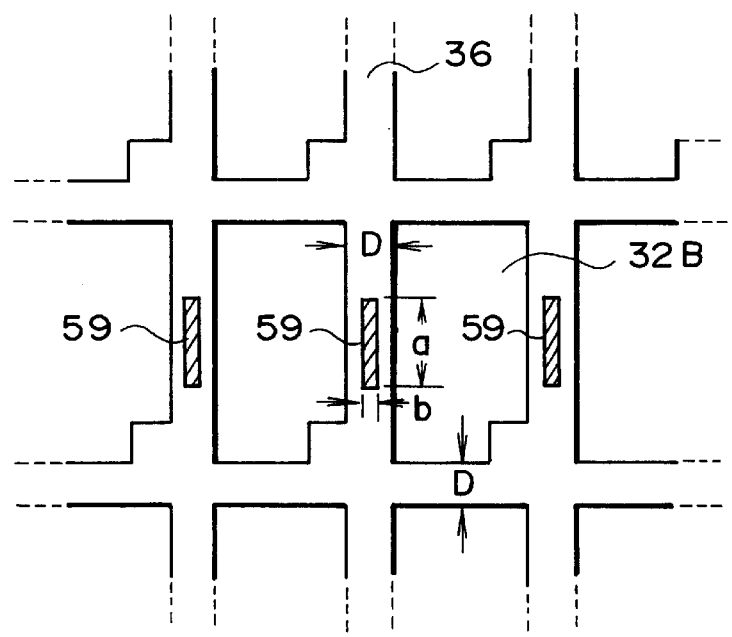
FIG. 32 is a plan view showing an example of arrangement of the spacers in the embodiment of FIG. 31.

When the spacer 33 is composed of the stacked color layers, there is used such a photo mask that the spacer satisfies the above requirements when forming the respective color layers. A cell gap in the liquid crystal display device in the fourteenth embodiment controlled with a high accuracy, wherein the cell gap is 1.7 ($\mu$m) on the average, 1.72 ($\mu$m) at the maximum and 1.68 ($\mu$m) at the minimum. Further, the major diameter direction of the spacer 33 is not parallel to the orientation direction of the orientation film. The spacer has, however, a small height, and hence a less load is applied upon the spacer 33 when executing the rubbing process. Therefore, no damage to the spacer is recognized, and a high quality display with a high contrast ratio is obtained. FIGS. 31 and 32 are a sectional view and a plan view showing a fifteenth embodiment of the present invention.

The construction thereof is similar to that in the thirteenth embodiment shown in FIG. 24, and therefore the explanations of the common portions are omitted.

A characteristic of the fifteenth embodiment is that the bottom surface of a spacer 33 composed of a stacked body of the color layers 32R, 32G and 32B takes a rectangular shape. More specifically, as illustrated in FIG. 32, the bottom surface of the spacer 33 assume a rectangular shape having a length a and $\underline{a}$ width b. The height H of the spacer and the width D of the light shielding layer are set such as H S b <D s a. This spacer 33 is provided on the light shielding film 36 of the opposite substrate 30 and is, when combined with the active matrix substrate 10, located on the scan line 13 of the active matrix substrate.

FIG. 33 is a Table for confirming a damaged state f the spacer by performing the rubbing process in which the spacer is required to have mechanical, strength most in order to confirm the mechanical strength of the spacer that is specified by the height, the length and the width. In this embodiment, it is not a premise that the longitudinal direction of the spacer is coincident with the orientation direction direction because of considering the use of the rectangular spacer. Referring to FIG. 33, the damaged state is observed wherein the height H of the spacer of the TFT-liquid crystal display device is set to 5 $\mu$m, the width D of the light shielding layer is set to 25 $\mu$m, and the length $\underline{a}$ and the width $\underline{b}$ are set to a variety of values. The symbol ○ in the Table represents the spacer with no conspicuous flaw after the rubbing, the symbol Δ indicates the spacer with conspicuous flaw after the rubbing, and the symbol X represents the spacer with the conspicuous flaw after the rubbing.

As a result, when the spacer width $\underline{b}$ is smaller than the spacer height H, and when the spacer length is smaller than the light shielding layer width, a defect of the spacer is recognized in the rubbing process. Accordingly, the configurational condition of the spacer assuming the elongate shape is at first given by: H≤b, and D<a.

Further, b<a from the relationship between the length and the width, and a relationship of b≤D must be established for the spacer not to extend into the pixel area. Therefore, the configurational condition of the spacer taking the elongate shape is, in the case of the active matrix liquid crystal display device, given by:

$$H \leq b \ D \leq a$$

and is, in the case of the simple matrix liquid crystal display device, given by:

$H \leq b < W \leq a$ where W is the interval between the display electrodes shown in FIG. 32.

According to the present invention, the width of the spacer exceeds the height of the spacer, and the length of the spacer is larger than the width of the light shielding layer, whereby the sufficient mechanical strength is obtained when the spacer functions. Obtained also is the strength enough not to cause a chip and an exfoliation of the spacer even in the rubbing process as an orientation process of the orientation film in which the spacer is required to have the mechanical strength most.

In contrast with the above-mentioned, if the width of the spacer is less than the height of the spacer, and if the length of the spacer is smaller than the width of the light shielding layer, the mechanical strength is insufficient when the spacer functions, and there might be caused the chip and the exfoliation of the spacer during the rubbing process of the orientation film.

Further, the width of the spacer is smaller than the width of the light shielding layer, and consequently the spacer does not enter the pixel, and the display quality never declines.

The spacer is composed of the same material as the color filter defined as the constructive material of the color liquid crystal display device and is formed simultaneously, whereby the spacer can be disposed without increasing the steps. It is also feasible to eliminate the dispersion spread step of the spacers (beads) that is needed in the conventional liquid crystal display device.

The method of manufacturing the liquid crystal display device shown in this embodiment is the same as those in the embodiments discussed so far, and there may be used the photomask suitable or effecting the exposure so that the spacer has a desired shape of the bottom surface. For instance, in the fifteenth embodiment, the patterning is effected so that the red color layer has a width of 15 ($\mu$m) and a length of 40 ($\mu$m).

The cell gap in the liquid crystal display device in this embodiment is controlled with a high accuracy, wherein the cell gap is 4.70 ($\mu$m) on the average, 4.80 ($\mu$m) at the maximum and 4.60 ($\mu$m) at the minimum. Further, no chip of the spacer is recognized, and the high-quality display with a high contrast ratio is obtained.

Figure 34:
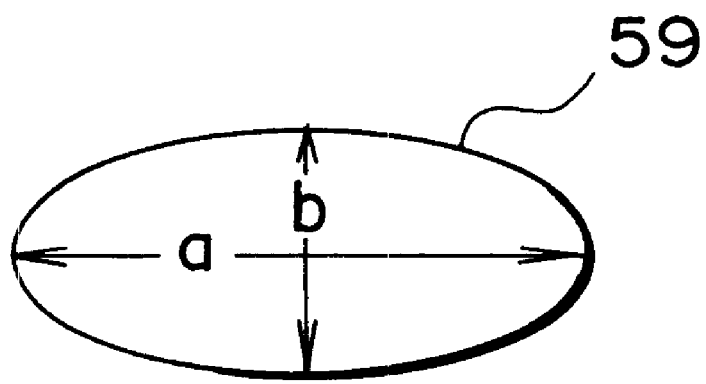
FIG. 34 is an explanatory view showing an elliptical spacer.
Figure 35:
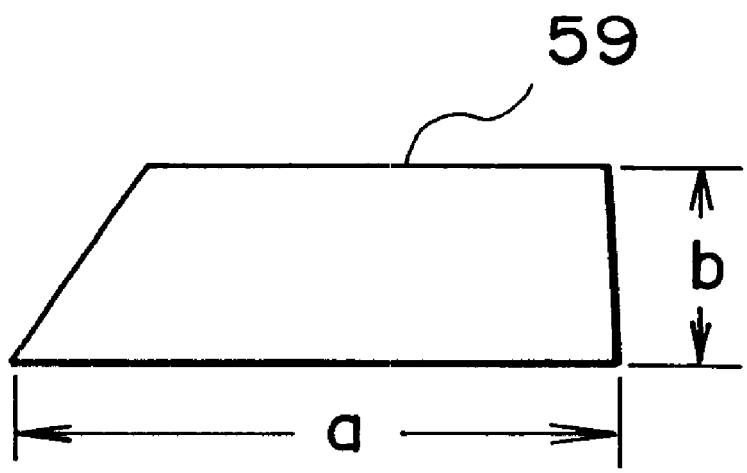
FIG. 35 is an explanatory view showing an example of a rectangular spacer.

Note that the bottom surface of the spacer 33 takes the rectangular shape in the fifteenth embodiment discussed above, but, as illustrated in FIG. 34, the ellipsoid, rhombus, triangle and trapezoid may be available, wherein the dimensions are different lengthwise and crosswise, and the length a and the width b are recognizable.

Disposed further on the opposite substrate 30 are the light shielding layer 36, the color filters 32R, 32G, 32B and the spacer 33. However, these elements may also be disposed on the active matrix substrate 10. In such a case, the alignment between the active matrix substrate 10 and the opposite substrate 30 is not required, and the high-quality liquid crystal display device can be manufactured at low costs.

Moreover, the active matrix liquid crystal display device has been exemplified, but the simple matrix liquid crystal display device may also be exemplified.

In addition, the spacer 3 is constructed by stacking the three color layers. It may, however, suffice that the desired cell gap is obtained by using two color or one color.

Further, in the embodiment discussed above, the photosensitive resist with the dispersion of the pigment as the material for the color filter is employed. However, the colored resin with the dispersion of the pigment may be subjected to the patterning based on etching by use of the well-known photolithography step without being confined to the photosensitive resist.

Similarly, the photosensitive resist with the dispersion of the pigment as the material for the light shielding layer 22 is employed. However, the colored resin with the dispersion of the pigment may undergo the patterning based on etching by use of the well-known photolithography step without being confined to the photosensitive resist. Further, materials such as metal chromium (Cr) and chromium oxide (CrO) other than the resin may also be used.

Moreover, a non-light-shielding member may serve as a function of the light shielding layer without providing the light shielding layer, and the spacer may also be provided on a non-light-transmitting member. In such a case, the same effects as those in the present invention are obtained.

It is apparent that, in this invention, a wide range of different working modes can be formed based on the invention without deviating from the spirit and scope of the invention. This invention is not restricted by its specific working modes except being limited by the appended claims.

What is claimed is:

1. A liquid crystal display device comprising:

first and second substrates disposed in parallel while keeping a predetermined gap;

a liquid crystal permeating into the gap and held between said first and second substrates, red, green and blue color layers disposed on said first substrate as color filters-for defining display areas;

a first electrode disposed on the red, green and blue color layers, for applying a voltage across the liquid crystal;

a first orientation film deposited on said first electrode and subjected to a first rubbing process;

a second electrode disposed on the second substrate for applying the voltage across said liquid crystal;

a second orientation film deposited on said second electrode and subjected to a second rubbing process, and a plurality of pillar-shaped spacers disposed on the first substrate, said spacers maintaining the predetermined gap, wherein said spacers are disposed at boundaries of the color layers so that said spacers are positioned in portions that are not adjacent to the green color layer among the color layers in a downstream direction of the first rubbing process from the position where spacers are disposed.

2. A liquid crystal display device according to claim 1 wherein said spacer is constructed by stacking said red, green and blue color layers.

3. A liquid crystal display device according to claim 1 wherein said spacers are adjacent at least one of the red and blue color layer.

* * * * *